United States Patent
Harada et al.

(10) Patent No.: US 7,619,600 B2
(45) Date of Patent: Nov. 17, 2009

(54) DRIVING METHOD OF LIQUID CRYSTAL DEVICE AND DRIVING DEVICE OF LIQUID CRYSTAL DEVICE

(75) Inventors: Haruo Harada, Kanagawa (JP); Hiroshi Arisawa, Kanagawa (JP); Yasunori Okano, Kanagawa (JP); Makoto Gomyou, Kanagawa (JP); Taijyu Gan, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 874 days.

(21) Appl. No.: 11/341,372

(22) Filed: Jan. 30, 2006

(65) Prior Publication Data
US 2007/0008262 A1 Jan. 11, 2007

(30) Foreign Application Priority Data
Jul. 5, 2005 (JP) ............................. 2005-195703

(51) Int. Cl.
*G09G 3/36* (2006.01)
(52) U.S. Cl. ............................. 345/87; 345/94; 349/33
(58) Field of Classification Search ........... 345/87–100, 345/204, 208–210; 349/2, 25, 29, 33, 74, 349/169, 175, 182–186
See application file for complete search history.

(56) References Cited
U.S. PATENT DOCUMENTS
6,414,669 B1 * 7/2002 Masazumi ................... 345/98

2001/0048414 A1 * 12/2001 Yamakawa et al. ............ 345/87

FOREIGN PATENT DOCUMENTS
| JP | A 11-237644 | 8/1999 |
| JP | A 11-326871 | 11/1999 |
| JP | A 2000-514932 | 11/2000 |

* cited by examiner

*Primary Examiner*—Regina Liang
(74) *Attorney, Agent, or Firm*—Oliff & Berridge, PLC

(57) ABSTRACT

A driving method of a liquid crystal device for recording an image, the liquid crystal device including a liquid crystal layer having a cholesteric liquid crystal, a photoconductor layer accumulated on the liquid crystal layer, and electrodes, includes initializing an entire liquid crystal layer to a focal conic texture by applying a voltage exceeding a threshold value of transition from a planar texture to a focal conic texture, exposing the liquid crystal device imagewise while applying a voltage not exceeding a threshold value from the focal conic texture to a homeotropic texture upon non-exposure but exceeding the threshold value upon exposure and that provides bistability of the focal conic texture and the homeotropic texture with hysteresis upon non-exposure, and fixing a displayed image by releasing an application of voltage to change a part of the liquid crystal layer changed to the homeotropic texture to the planar texture.

14 Claims, 12 Drawing Sheets

PLANAR

FORCAL CONIC

HOMEOTROPIC

DRIVING METHOD OF LIQUID CRYSTAL DEVICE AND DRIVING DEVICE OF LIQUID CRYSTAL DEVICE

BACKGROUND OF THE INVENTION

1. Field of the Invention

The present invention relates to a driving method for writing an image on a liquid crystal device displaying and recording an image by using a liquid crystal and a photoconductor, and a driving device for the liquid crystal device.

2. Description of the Related Art

There is increasing expectation of a rewritable marking technique as an alternative to paper as a hardcopy technique due to such reasons as protection of the global environment including forest resources and space saving.

The paper hardcopy has various advantages that the conventional electronic display devices do not have, i.e., (1) it attains reflective full color display with high brightness and contrast, can be easily read and has a high information displaying density, (2) it has such a structure that attains light weight, thinness and flexibility, and can be viewed in a comfortable position with wide room for choice of illumination conditions, (3) it can display and record information without power source owing to memory effect in displaying, and is free of eyestrain owing to display without flicker, and (4) it attains display at low cost, and easily provides list view with plural sheets simultaneously displayed, which facilitates comparison and browse of information.

Accordingly, there has been such a phenomenon that paperless environments are not facilitated in offices, and information displayed on an electronic display is printed on paper as a hardcopy for browsing. Therefore, a display medium as an alternative to paper should have the aforementioned various advantages inherent to paper in addition to rewritable capability for resource saving and reduction of wastes.

Various rewritable marking techniques having high convenience have been studied, and as one measure thereof, a liquid crystal device having a liquid crystal and a photoconductor accumulated on each other is receiving attention since information can be repeatedly recorded and deleted thereon, and various excellent characteristics are realized. As an example of the technique, the inventors have proposed a liquid crystal device in JP-A-11-237644. The liquid crystal device contains a liquid crystal layer and a photoconductor layer accumulated on each other, in which the liquid crystal layer is a self-maintaining liquid crystal composite containing a cholesteric liquid crystal and a transparent resin, and the photoconductor layer is an organic photoconductor layer, and has the following advantages. The liquid crystal device can form an image without simultaneous exposure over the entire surface of the liquid crystal device, and can reduce the size and cost of the writing apparatus. The liquid crystal device itself is thin and light, which facilitates handling. Accordingly, the liquid crystal device provides, as a total system, a rewritable display medium and a writing apparatus, which can be an alternative to a hardcopy.

The technique employed in the liquid crystal device of JP-A-11-237644 will be described briefly. A planar texture exhibited by a cholesteric liquid crystal (chiral nematic liquid crystal) separates light incident in parallel to the helical axis thereof into dextrorotatory light and levorotatory light, and causes such a selective reflection phenomenon that a circularly polarized component agreeing with the twist direction of the helix is reflected by Bragg reflection, and the remaining light component is transmitted. The center wavelength λ and the reflected wavelength range Δλ are expressed by the following equations:

$$\lambda = n \cdot p$$

$$\Delta\lambda = \Delta n \cdot p$$

wherein p represents the helix pitch, n represents the average refractive index within the plane perpendicular to the helical axis, and Δn represents the birefringence within that plane. The light reflected by the cholesteric liquid crystal layer having a planar texture exhibits a bright color depending on the helix pitch.

A cholesteric liquid crystal having a positive dielectric anisotropy shows the following three states. That is, in a planar texture, the helical axis is perpendicular to the cell surface as shown in FIG. 14A, and the incident light is subjected to the aforementioned selective reflection phenomenon. In a focal conic texture, the helical axis is substantially in parallel to the cell surface as shown in FIG. 14B, and the incident light is transmitted with slightly forward scattering. In a homeotropic texture, the helical structure is unraveled to direct the liquid crystal director to the electric field direction as shown in FIG. 14C, and the incident light is substantially completely transmitted.

Among the three states, the planar texture and the focal conic texture can be bistability present under no electric field. Therefore, the phase state of a cholesteric liquid crystal is not determined unconditionally without the intensity of the electric field applied to the liquid crystal layer, and in the case where a planar texture appears as the initial state, the phase state is changed sequentially to a planar texture, a focal conic texture and a homeotropic texture in this order with increase of the intensity of the electric field, and in the case where a focal conic texture appears as the initial state, the phase state is changed sequentially to a focal conic texture and a homeotropic texture in this order with increase of the intensity of the electric field.

In the case where the intensity of the electric field applied to the liquid crystal layer is decreased suddenly to zero, the planar texture and the focal conic texture maintain the states as they are, and the homeotropic texture is changed to a planar texture.

Therefore, the cholesteric liquid crystal layer immediately after applied with a pulse signal shows switching behavior as shown in FIG. 15. That is, when the voltage of the pulse signal applied is Vfh or higher, a selective reflection state where a homeotropic texture is changed to a planar texture appears. When the voltage is from Vpf to Vfh, a transmission state with a focal conic texture appears. When the voltage is Vpf or lower, the state before applying the pulse signal is continued, i.e., a selective reflection state with a planar texture or a transmission state with a focal conic texture appears.

In FIG. 15, the ordinate shows the normalized reflectivity, which is obtained by normalizing the reflectivity with the maximum reflectivity as 100 and the minimum reflectivity as 0. A transition state appears among the planar texture, the focal conic texture and the homeotropic texture, and therefore, it is determined that the case where the normalized reflectivity is 50 or more is designated as the selective reflection state, the case where the normalized reflectivity is less than 50 is designated as the transmission state, the threshold voltage of phase transition from the planar texture to the focal conic texture is designated as Vph, and the threshold voltage of phase transition from the focal conic texture to the homeotropic texture is designated as Vfh.

Particularly, in the PNLC (polymer network liquid crystal) structure containing a network resin in a continuous phase of a cholesteric liquid crystal, and the PDLC (polymer dispersed liquid crystal) structure containing a cholesteric liquid crystal dispersed as droplets in a polymer skeleton (including those microencapsulated), the bistability of a planar texture and a focal conic texture under no electric field is increased with interference at an interface between the cholesteric liquid crystal and the polymer (anchoring effect), whereby the state immediately after applying a pulse signal can be maintained for a long period of time.

In the liquid crystal device using the technique, (A) the selective reflection state with a planar texture and (B) the transmission state with a focal conic texture are switched by utilizing the bistability phenomenon of the cholesteric liquid crystal, so as to realize black/white monochrome display having a memory effect under no electric field or color display having a memory effect under no electric field.

In the liquid crystal device using the technique, furthermore, the self-maintaining liquid crystal composite and the organic photoconductor can be formed and accumulated by such a measure as coating a coating composition or laminating, and therefore, the liquid crystal device can be easily produced at low cost. The self-maintaining liquid crystal composite and the organic photoconductor can attain such a resolution that is required for a hardcopy and can attain sufficiently high resolution of the liquid crystal device.

The liquid crystal device using the technique can form an image over the entire surface thereof without exposure, and thus an image can be written therein by scanning the surface of the liquid crystal device by using a scanning exposure device, such as a laser exposure device and a light-emitting diode array.

FIG. 16 is a schematic cross sectional view showing the liquid crystal device using the technique where an image is written therein with a scanning exposure device. As shown in FIG. 16, the liquid crystal device using the technique contains a display layer as a liquid crystal layer, an OPC layer as a photoconductor layer and, for example, a light absorbing layer, which are held between a pair of transparent electrode substrates. After resetting the entire surface of the display layer to a planar texture, the surface thereof on the side of the OPC layer is exposed imagewise by scanning with an exposure device, such as a line head or a beam scanner, under application of a prescribed bias voltage between the transparent electrodes, whereby a desired image can be written therein.

As having been described, the liquid crystal layer upon writing forms a desired image by producing contrast between a part that undergoes transition from a planar texture to a focal conic texture and a part that does not undergo the phase change, depending on the presence or absence of exposure. The transition from a planar texture to a focal conic texture requires a certain period of time. Specifically, the liquid crystal layer completes the phase change over several hundreds milliseconds (about 200 ms or more), and thus a writing time of several hundreds milliseconds is consumed per one scanning line (or one pixel). As a result, a prolonged period of time is required for rewriting the entire surface of the liquid crystal device in total. Consequently, the aforementioned technique is still insufficient in practicality on writing.

Under the circumstances, the invention provides such a driving method of a liquid crystal device and a driving device of a liquid crystal device that have the following features. The liquid crystal device can form an image without simultaneous exposure over the entire surface of the liquid crystal device, and can reduce the size and cost of the writing apparatus. The liquid crystal device itself is thin and light, which facilitates handling. Accordingly, the liquid crystal device provides, as a total system, a rewritable display medium and a writing apparatus, which can be an alternative to a hardcopy. More specifically, the liquid crystal display device has a self-maintaining liquid crystal composite containing a cholesteric liquid crystal and a transparent resin as a liquid crystal layer, and an organic photoconductor layer as a photoconductor layer, which are accumulated to each other, and upon writing an image in the liquid crystal device through exposure with a scanning exposure device, an image can be written in a short writing time to impart high practicality to the driving method and driving device.

SUMMARY OF THE INVENTION

According to an aspect of the present invention, a driving method of a liquid crystal device for recording an image, the liquid crystal device including a liquid crystal layer having a cholesteric liquid crystal, a photoconductor layer accumulated on the liquid crystal layer, and electrodes disposed outside the liquid crystal layer and the photoconductor layer, includes an initializing step of making an entire liquid crystal layer to be a focal conic texture by applying between the electrodes a voltage that exceeds a threshold value of transition from a planar texture to a focal conic texture in the liquid crystal layer, a writing step of exposing the liquid crystal device imagewise while applying between the electrodes a voltage that does not exceeds a threshold value of transition from the focal conic texture to a homeotropic texture in the liquid crystal layer upon non-exposure but exceeds the threshold value upon exposure and that provides bistability of the focal conic texture and the homeotropic texture with hysteresis upon non-exposure, and a display fixing step of fixing a displayed image by releasing an application of voltage to change a part of the liquid crystal layer changed to the homeotropic texture to the planar texture.

According to another aspect of the present invention, a driving device of a liquid crystal device for recording an image, the liquid crystal device including a liquid crystal layer having a cholesteric liquid crystal, a photoconductor layer accumulated on the liquid crystal layer, and a pair of electrodes disposed outside the liquid crystal layer and the photoconductor layer, includes an electric power unit capable of applying a voltage between the electrodes, and an exposing unit capable of exposing the liquid crystal device. The driving device executes sequentially an initializing operation of making an entire liquid crystal layer be a focal conic texture by applying with the electric power unit a voltage that exceeds a threshold value of transition from a planar texture to a focal conic texture in the liquid crystal layer, a writing operation of exposing the liquid crystal device image wise with the exposing unit while applying with the electric power unit a voltage that does not exceeds a threshold value of transition from the focal conic texture to a homeotropic texture in the liquid crystal layer upon non-exposure but exceeds the threshold value upon exposure and that provides bistability of the focal conic texture and the homeotropic texture with hysteresis upon non-exposure, and a display fixing operation of changing a part of the liquid crystal layer changed to the homeotropic texture to the planar texture by releasing an application of voltage with the electric power unit.

BRIEF DESCRIPTION OF THE DRAWING

FIGS. 14A to 14C are schematic diagrams showing the relationship between a molecular orientation of a cholesteric liquid crystal and optical characteristics thereof, in which FIG. 14A is in a planar texture, FIG. 14B is in a focal conic texture, and FIG. 14C is in a homeotropic texture;

DETAILED DESCRIPTION OF THE INVENTION

In the driving method of a liquid crystal device of the invention, the exposure unit used in the writing step may be such an exposure unit that is capable of scanning the entire surface of the liquid crystal device one-dimensionally or two-dimensionally including a scanning system using laser light, a light-emitting diode array or the like. A two-dimensional bulk exposure unit with plane light emission may also be used.

In the driving device of a liquid crystal device of the invention, the exposure unit may be such an exposure unit that is capable of scanning the entire surface of the liquid crystal device one-dimensionally or two-dimensionally including a scanning system using laser light, a light-emitting diode array or the like. A two-dimensional bulk exposure unit with plane emission may also be used.

Figure 2:
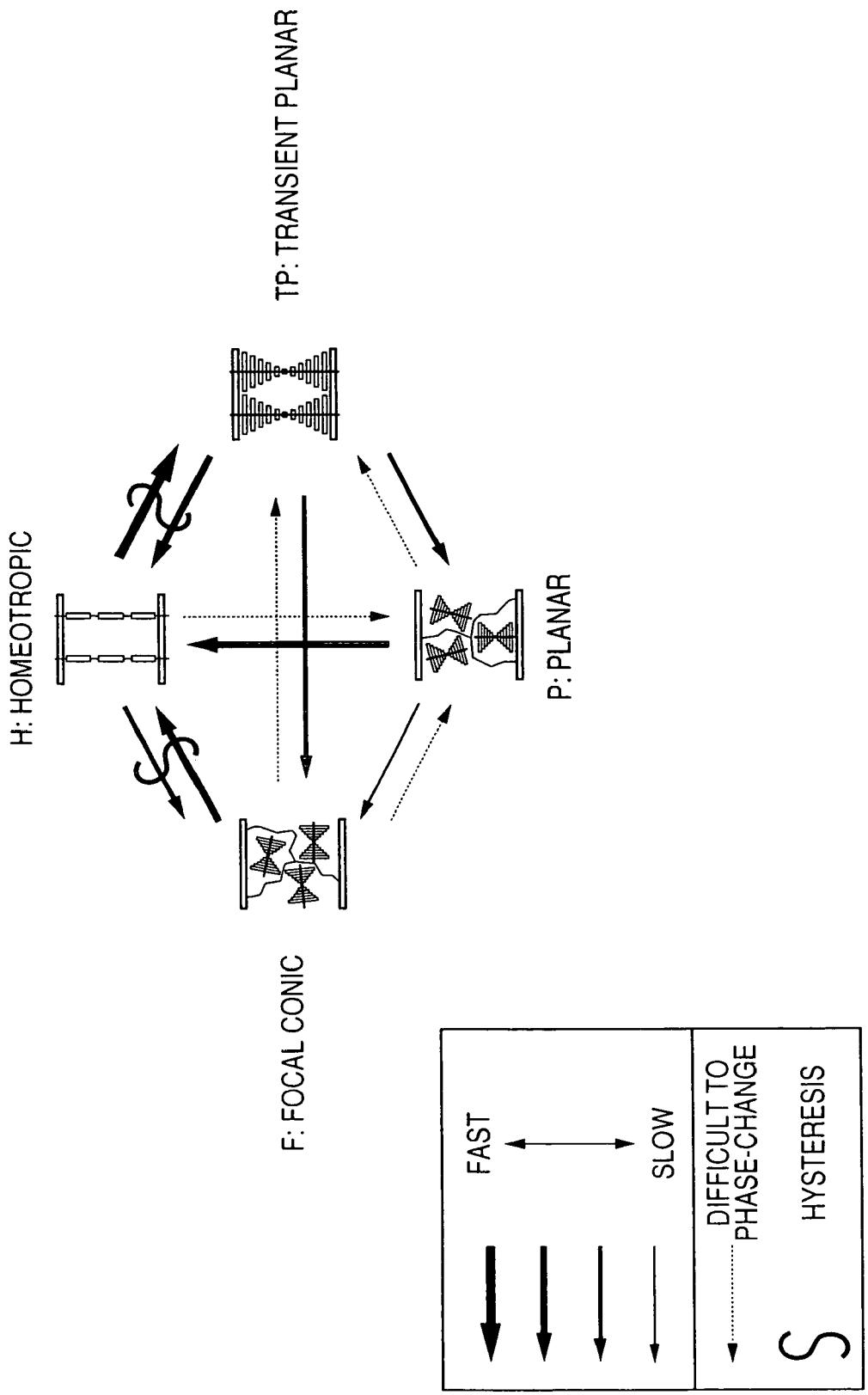
FIG. 2 is a schematic diagram showing the list view of phase change of a cholesteric liquid crystal.

FIG. 2 is a schematic diagram showing the list view of phase change of a cholesteric liquid crystal. Upon applying a voltage, the state of the liquid crystal is changed from a planar texture to a focal conic texture, and further changed to a homeotropic texture.

According to the technique disclosed in JP-A-11-237644 described hereinabove, a planar texture is used as the initial state, and the device is exposed imagewise under application of a voltage to change the planar texture to a focal conic texture, whereby an image is written in the liquid crystal layer (display layer). The state of the layer is maintained after releasing the voltage application in both the planar texture and the focal conic texture, and thus the image thus written in is stably maintained.

However, the rate of transition from a planar texture to a focal conic texture is significantly low as shown in FIG. 2, and it requires several hundreds milliseconds as having been described. If such a period is consumed for respective pixels or lines, a prolonged period of time is required for writing an image by scanning the entire surface of the liquid crystal layer. In other words, for example, when 200 ms is required for writing one line, and the next line is exposed after completing the phase change, a period of (200 ms or more)×(line number) is required for writing. Therefore, 20 seconds or more is required for writing an image containing 100 lines, and 1 minute and 30 seconds or more is required for writing an image containing 480 lines. Consequently, the aforementioned technique is insufficient in practicality on writing.

Figure 3:
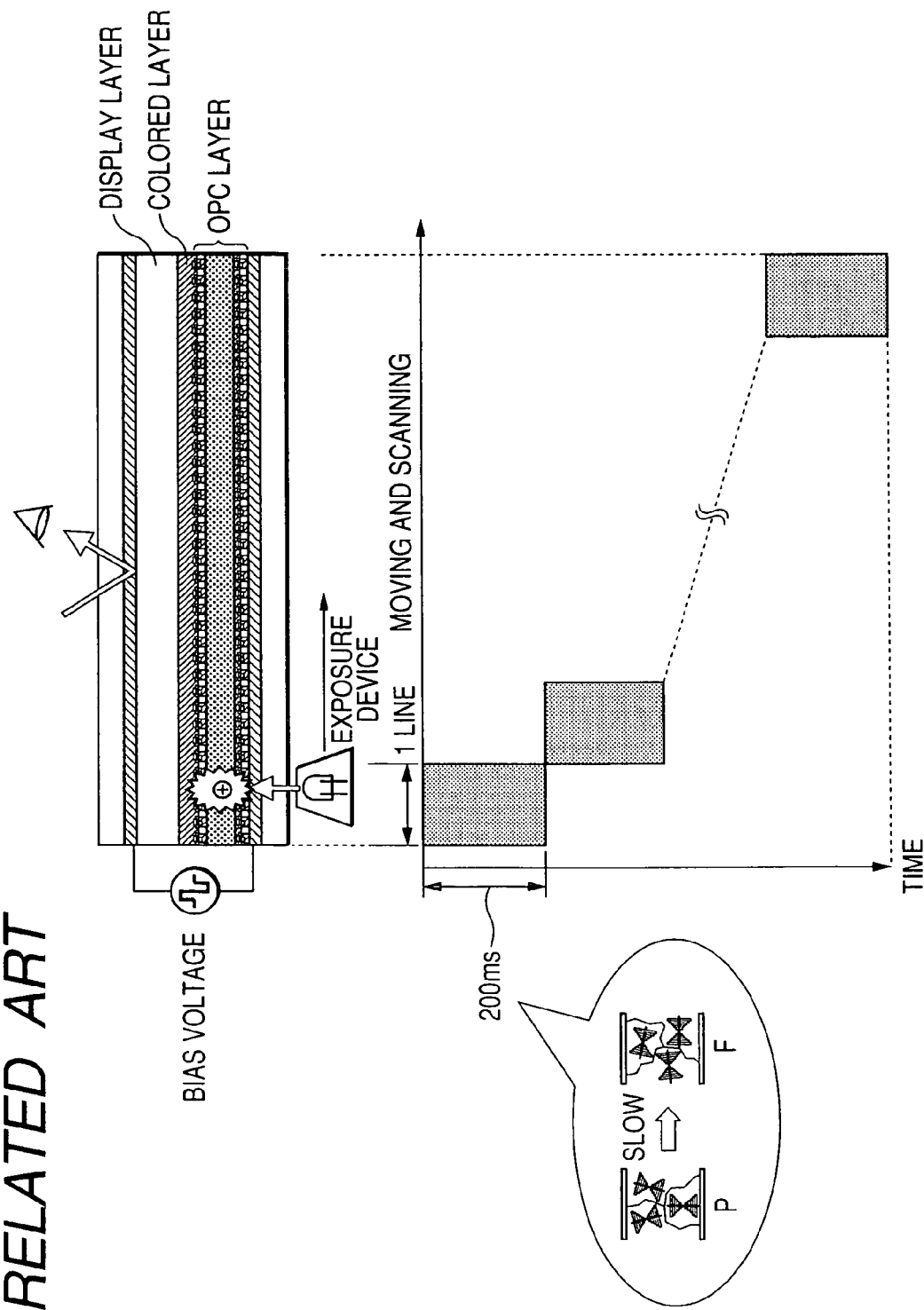
FIG. 3 is a schematic diagram showing a writing time with a scanning exposure device by the conventional driving method of a liquid crystal device.

FIG. 3 is a schematic diagram showing the period of time for writing an image with a scanning exposure device by the conventional driving method of a liquid crystal device.

The invention employs transition from a focal conic texture to a homeotropic texture with a high phase change rate for writing an image, rather than transition from a planar texture to a focal conic texture with a low phase change rate. That is, the bias voltage and the addressing light intensity are set to satisfy the following conditions.

In a dark state (non-exposed part), no orientation change occurs in both a focal conic texture state (F state) and a homeotropic texture state (H state) (hysteresis behavior).

In a bright state (exposed part), the F state is changed to an H state, but the H state undergoes no change.

Thereafter, application of the bias voltage is started to change the entire surface to an F state, and then the surface is exposed with an exposing unit (exposing device) based on the image data in such a manner that reflection parts of the image is exposed to light to write the image therein.

The dark and bright states on the liquid crystal layer undergo the following changes: (1) resetting to the initial state (F state) (initializing step or operation), (2) selecting an H state or an F state depending on on/off of addressing light with an exposure unit (exposing device) (writing step or operation), (3) maintaining the selected state by utilizing hysteresis between the H state and the F state, and (4) after writing all the lines, releasing the bias voltage to change the part of the H state to a planar state (P state) and to maintain the F state unchanged, whereby the displayed image is fixed to complete display of the image (display fixing step or operation).

The phase change (change in orientation) from an F state to an H state with a high phase change rate is utilized, and an image is maintained by hysteresis between these phases, whereby the period of time required for exposure (light addressing) is reduced to shorten the writing time significantly.

Figure 4:
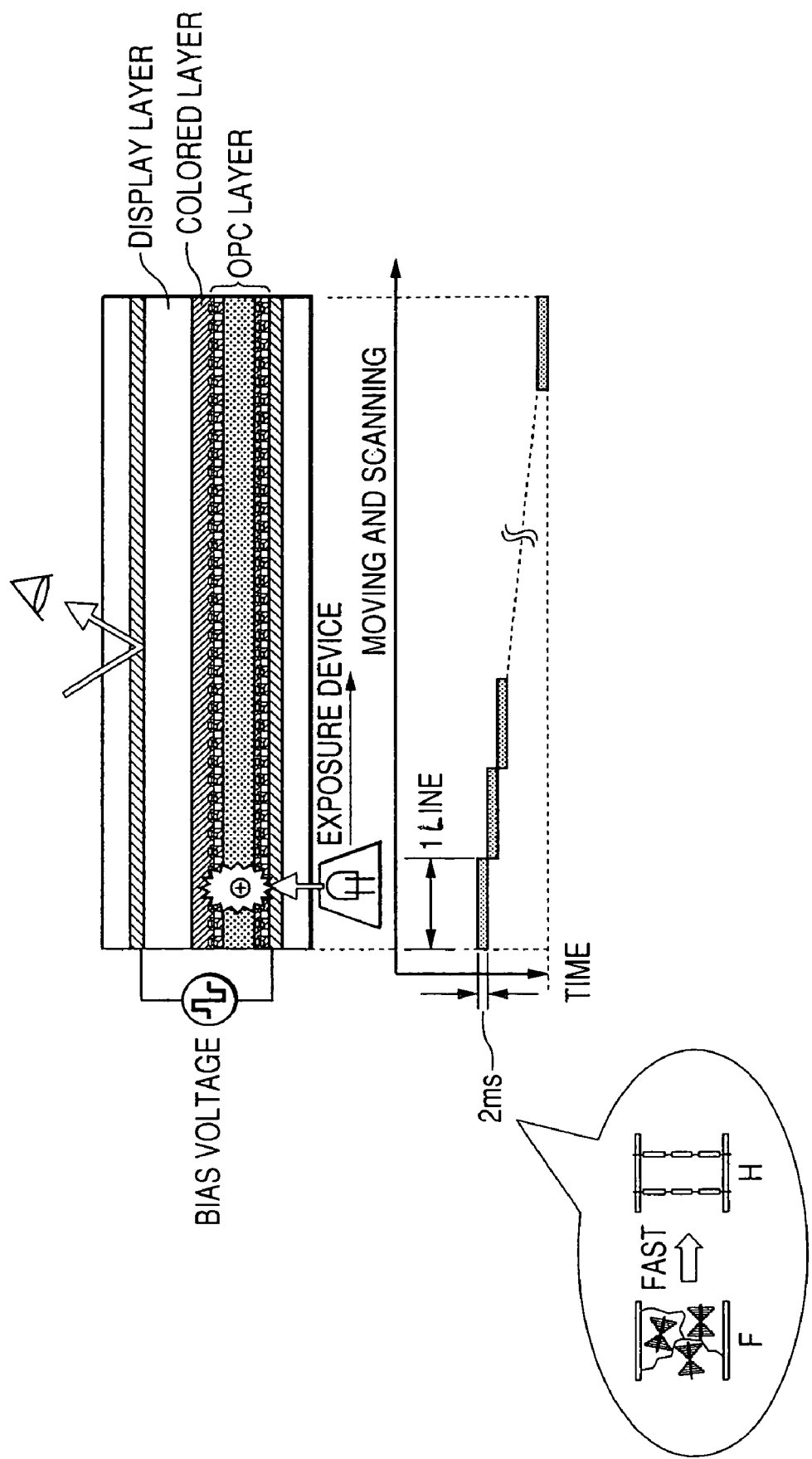
FIG. 4 is a schematic diagram showing a writing time with a scanning exposure device by the driving method of a liquid crystal device according to the invention.

Since the period of time required for transition from an F state to an H state is about 2 ms or more, the writing time can be theoretically shortened to 1% at a maximum as compared to the conventional technique utilizing transition from a P state to an F state. FIG. 4 is a schematic diagram showing the writing time by the driving method of a liquid crystal device according to the invention in the similar manner as FIG. 3. As apparent from FIG. 4, the period of time required for writing one line can be significantly reduced, and thus the total writing time can be significantly shortened.

That is, since only (2 ms or more)×(line number) is required for writing, for example, only about 0.2 seconds is required for writing an image containing 100 lines, and only about 2.5 seconds is required for writing an image containing 480 lines. Consequently, the practicality on writing, which is insufficient in the conventional technique, is significantly improved in the invention.

The functions and advantages of the invention have been described with reference to such an exposing unit (device) that is capable of exposing the entire surface of the liquid crystal device by scanning one-dimensionally or two-dimensionally, but the invention may employ a two-dimensional bulk exposure unit (device) with plane light emission to obtain various functions and advantages.

By using a two-dimensional bulk exposure unit (device), the exposure time for writing an image is only 200 ms, which is less than one second, even in the conventional technique, and therefore, the invention does not provide any considerable advantage in this regard. Furthermore, the invention requires about 200 ms to apply a voltage for resetting to the initial state (F state) in the initializing step (initializing operation), and thus there is substantially no difference in total time for writing an image between the conventional technique and the invention.

However, since a two-dimensional bulk exposure unit (device) consumes a large amount of energy, the invention provides such a significant advantage that decreasing the exposure time to $\frac{1}{100}$ can reduce the energy cost. The advantage can also enjoyed in the case where an exposure unit (device) capable of exposing the entire surface of the liquid crystal device by scanning one-dimensionally or two-dimensionally since the advantage is common in such a point that the writing time through exposure can be significantly reduced.

According to the invention, such a driving method of a liquid crystal device and a driving device of a liquid crystal device with high practicality are provided that require only a short writing time in the case where an image is written in a liquid crystal device useful as a rewritable display medium having excellent characteristics, which contains a self-maintaining liquid crystal composite containing a cholesteric liquid crystal and a transparent resin as a liquid crystal layer, and an organic photoconductor layer as a photoconductor layer accumulated thereon, by exposing the liquid crystal layer particularly with a scanning exposure device.

According to the invention, furthermore, the period of light irradiation for writing an image can be reduced in both cases using a scanning exposure device and a plane light emission exposure device, and thus such a driving method of a liquid crystal device and a driving device of a liquid crystal device are provided that contribute to energy saving.

The invention will be described in detail with reference to the drawings.

Figure 1:
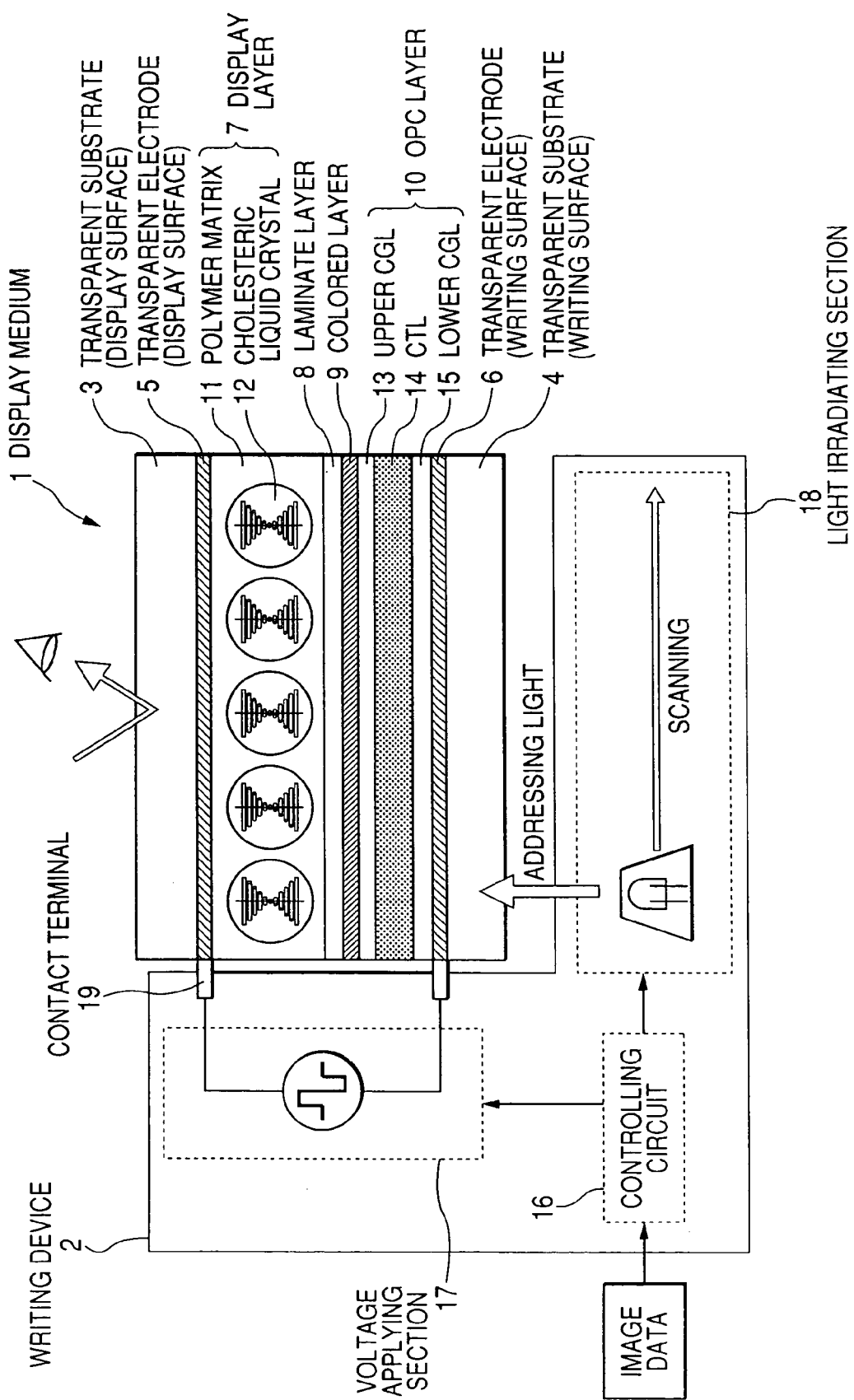
FIG. 1 is a schematic constitutional view showing an exemplary embodiment of a system, to which the driving method of a liquid crystal device of the invention is applied.

FIG. 1 is a schematic constitutional view showing an exemplary embodiment of a system, to which the driving method of a liquid crystal device of the invention is applied. The driving device of a liquid crystal device of the embodiment has a display medium (liquid crystal device) 1 and a writing device (driving device of a liquid crystal device) 2. These constitutional components will be described in detail, and then the operations thereof will be described.

(Display Medium)

The display medium of the invention is such a member that undergoes a light addressing operation through irradiation of addressing light and application of a bias signal, and is specifically a liquid crystal device.

In this embodiment, the display device 1 contains a transparent substrate 3, a transparent electrode 5, a display layer (liquid crystal layer) 7, a laminate layer 8, a colored layer (light shielding layer) 9, an OPC layer (photoconductor layer) 10, a transparent electrode 6 and a transparent substrate 4, which are accumulated on each other in this order from the display surface.

(Transparent Substrate)

The transparent substrates 3 and 4 are such members that retain the functional layers inside to maintain the structure of the display medium. The transparent substrates 3 and 4 each are a member in a sheet form having strength capable of withstanding an external force. The substrate 3 on the display surface transmits at least incident light, and the substrate 4 on the writing surface transmits at least addressing light. The substrate preferably has flexibility. Specific examples of the material of the substrate include an inorganic sheet (such as glass and silicon), and a polymer film (such as polyethylene terephthalate, polysulfone, polyether sulfone, polycarbonate and polyethylene naphthalate). The substrate may have formed on the outer surface thereof a known functional film, such as an antifouling film, an antiwear film, an antireflection film and a gas barrier film.

Even in the case where a substrate is used in the invention, the substrate may not necessarily transparent.

(Transparent Electrode)

The transparent electrodes 5 and 6 are such members that plane-uniformly apply a bias voltage applied from the writing device 2 to the functional layers of the display medium 1. The transparent electrodes 5 and 6 have plane-uniform electroconductivity. The transparent electrode 5 on the display surface transmits at least incident light, and the transparent electrode 6 on the writing surface transmits at least addressing light. Specific examples thereof include electroconductive thin films formed of a metal (such as gold and aluminum), a metallic oxide (such as indium oxide, tin oxide and indium tin oxide (ITO)), and an electroconductive organic polymer (such as a polythiophene polymer and a polyaniline polymer). The transparent electrode may have formed on the surface thereof a known functional film, such as an adhesiveness improving film, an antireflection film and a gas barrier film.

In the invention, the electrode may not necessarily transparent.

(Display Layer)

The display layer in the invention has such a function that the reflection or transmission state of only light having a specific color among incident light is modulated with an electric field, and the selected state is maintained under no electric field. The display layer preferably has such a function that withstands deformation due to an external force, such as flexure and pressure.

The display layer in the invention has a liquid crystal layer of a self-maintaining liquid crystal composite containing a cholesteric liquid crystal and a transparent resin. In other words, the composite is a liquid crystal layer having self-maintaining property without a spacer or the like. In this embodiment, a cholesteric liquid crystal 12 is dispersed in a polymer matrix (transparent resin) 11 as shown in FIG. 1.

The cholesteric liquid crystal 12 has a function of modulating the reflection or transmission state to light having a specific color among incident light, in which liquid crystal molecules are oriented with twisting in a helical form, so as to interfere and reflect only specific light depending on the helical pitch among light incident from the direction of the helical axis. The orientation of the molecules is changed with an electric field to change the reflection state. The droplets of the cholesteric liquid crystal preferably have a uniform size and are preferably disposed densely to form a single layer.

Examples of a liquid crystal that can be used as the cholesteric liquid crystal 12 include a nematic liquid crystal and a smectic liquid crystal (such as a Schiff base series, an azo series, an azoxy series, a benzoate ester series, a biphenyl series, a terphenyl series, a cyclohexylcarboxylate ester series, a phenylcyclohexane series, a biphenylcyclohexane series, a pyrimidine series, a dioxane series, a cyclohexylcyclohexane ester series, a cyclohexylethane series, a cyclohexane series, a tolan series, an alkenyl series, a stilbene series and a polycondensed ring series), and a mixture thereof having a chiral agent (such as a steroid cholesterol series derivative, a Schiff base series, an azo series, an ester series and a biphenyl series) added thereto.

The helical pitch of the cholesteric liquid crystal is controlled by the addition amount of the chiral agent with respect to the nematic liquid crystal. For example, in the case where the display colors are blue, green and red, the center wavelengths of selective reflection are in the ranges of from 400 to 500 nm, from 500 to 600 nm and from 600 to 700 nm, respectively. In order to compensate the temperature dependency of the helical pitch of the cholesteric liquid crystal, such a known measure may be employed that plural chiral agents having different twist directions or opposite temperature dependencies are added.

Examples of the configuration of the display layer 7 constituting the self-maintaining liquid crystal composite containing the cholesteric liquid crystal 12 and the polymer matrix (transparent resin) 11 include a PNLC (polymer network liquid crystal) structure containing a network resin in a continuous phase of the cholesteric liquid crystal, and the PDLC (polymer dispersed liquid crystal) structure containing the cholesteric liquid crystal dispersed as droplets in a polymer skeleton (including those microencapsulated). The PNLC structure and the PDLC structure form an anchoring effect at an interface between the cholesteric liquid crystal and the polymer, whereby the maintaining state of a planar texture or a focal conic texture under no electric field can be further stabilized.

The PNLC structure and the PDLC structure can be formed by such known methods as a PIPS (polymerization induced phase separation) method, in which a polymer precursor capable of being polymerized with heat, light, an electron beam or the like, such as an acrylic series, a thiol series and an epoxy series, is mixed with a liquid crystal, and the resulting uniform phase is polymerized to induce phase separation, an emulsion method, in which a polymer having a low solubility to a liquid crystal, such as polyvinyl alcohol, is mixed with the liquid crystal, and agitated to disperse droplets of the liquid crystal in the polymer, a TIPS (thermally induced phase separation) method, in which a thermoplastic polymer and a liquid crystal are mixed and heated to obtain a uniform phase, which is then cooled to induce phase separation, and an SIPS (solvent induced phase separation) method, in which a polymer and a liquid crystal are dissolved in a solvent, such as chloroform, and the solvent is evaporated to induce phase separation of the polymer and the liquid crystal, but the invention is not limited to these methods.

The polymer matrix 11 has such a function that the cholesteric liquid crystal 12 is maintained to suppress flowage of the liquid crystal (change of an image) due to deformation of the display medium, and preferred examples thereof include a polymer material that is not dissolved in a liquid crystal material and is dissolved in a solvent that is not compatible with the liquid crystal. It is desirable that the polymer matrix 11 has strength for withstanding an external force and exhibits high transparency at least to the reflection light and the addressing light.

Examples of the material that can be used as the polymer matrix 11 include a water soluble polymer material (such as gelatin, polyvinyl alcohol, a cellulose derivative, a polyacrylic acid polymer, ethylene imine, polyethylene oxide, polyacrylamide, polystyrene sulfonate salt, polyamidine and an isoprene sulfonic acid polymer), and a material that can form an aqueous emulsion (such as a fluorine resin, a silicone resin, an acrylic resin, a urethane resin and an epoxy resin).

(OPC Layer)

The OPC layer (photoconductor layer) 10 is such a layer that has an internal photoelectric effect and changes in impedance characteristics corresponding to the radiation intensity of the addressing light. It is preferred that the OPC layer can be driven with alternating current and driven symmetrically with respect to the addressing light. The OPC layer preferably has a three-layer structure containing a charge transporting layer (CTL) having charge generating layers (CGL) accumulated on both surfaces thereof. In this embodiment, the OPC layer 10 has an upper charge generating layer 13, a charge transporting layer 14 and a lower charge generating layer 15 accumulated from the upper side in FIG. 1.

The charge generating layers 13 and 15 have such a function that photo carriers are generated through absorption of addressing light. The charge generating layer 13 mainly controls the amount of photo carriers flowing from the transparent electrode 5 on the display surface to the transparent electrode 6 on the writing surface, and the charge generating layer 15 mainly controls the amount of photo carriers flowing from the transparent electrode 6 on the writing surface to the transparent electrode 5 on the display surface. It is preferred that the charge generating layers 13 and 15 generate excitons through absorption addressing light, which are efficiently separated into free carriers in the charge generating layer or at the interface between the charge generating layer and the charge transporting layer.

The charge generating layers 13 and 15 can be formed, for example, by a dry method, in which a charge generating material is directly formed into a layer, or a wet coating method, in which a charge generating material is dispersed or dissolved in a suitable solvent along with a polymer binder to obtain a coating composition, which is then coated and dried to form the layer. Examples of the charge generating material include a metallic or non-metallic phthalocyanine, a squalirium compound, an azulenium compound, a perylene pigment, an indigo pigment, a bis- or tris-azo pigment, a quinacridone, a pyrrolopyrol colorant, a polycyclic quinone pigment, a condensed aromatic pigment, such as dibromoanthanthrone, a cyanine colorant, a xanthene pigment, a charge transfer complex, such as polyvinylcarbazole and nitrofluorene, and an eutectic complex formed of a pyrylium salt dye and a polycarbonate resin. Examples of the polymer binder include a polyvinyl butyral resin, a polyarylate resin, a polyester resin, a phenol resin, a vinylcarbazole resin, a vinyl formal resin, a partially modified vinylacetal resin, a carbonate resin, an acrylic resin, a vinyl chloride resin, a styrene resin, a vinyl acetate resin and a silicone resin.

The charge transporting layer 14 has such a function that the photocarriers generated in the charge generating layers 13 and 15 are injected therein and drifted in the direction of an electric field applied with the bias signal. In general, the charge transporting layer has a thickness that is several tens times the thickness of the charge generating layer, and therefore, the contrast impedance of the entire OPC layer 10 is determined by the capacity of the charge transporting layer 14, the dark current of the charge transporting layer 14 and the photo carrier current inside the charge transporting layer 14.

In the charge transporting layer 14, it is preferred that the injection of free carriers from the charge generating layers 13 and 15 occurs with high efficiency (the charge transporting layer 14 preferably has an ionization potential close to those of the charge generating layers 13 and 15), and the free carriers thus injected undergo hopping migration at a rate as high as possible. In order to increase the dark impedance, the dark current with thermal carriers is preferably low.

The charge transporting layer 14 may be formed in such a manner that a low molecular weight hole transporting material or a low molecular weight electron transporting material is dispersed or dissolved in a suitable solvent along with a polymer binder to obtain a coating composition, or in alternatively, the hole transporting material or the electron transporting material is formed into a polymer, which is then dispersed or dissolved in a suitable solvent to obtain a coating composition, and the coating composition is coated and dried. Examples of the low molecular weight hole transporting material include a trinitrofluorene compound, a polyvinylcarbazole compound, an oxadiazole compound, a hydrazone compound, such as benzylamino hydrazone and quinoline hydrazone, a stilbene compound, a triphenylamine compound, a triphenylmethane compound and a benzidine compound. Examples of the low molecular weight electron transporting material include a quinone compound, a tetracyanoquinodimethane compound, a fluorenone compound, a xanthone compound and a benzophenone compound. Examples of the polymer binder include a polycarbonate resin, a polyarylate resin, a polyester resin, a polyimide resin a polyamide resin, a polystyrene resin and a silicon-containing crosslinked resin.

(Colored Layer)

The colored layer (light shielding layer) 9 is provided for such a purpose that addressing light and writing light are separated upon writing to prevent malfunction due to mutual interference, and external light incident from the non-display surface of the display medium and the displayed image are optically separated upon displaying to prevent the image from being deteriorated, and is not an essential constitutional element of the invention. However, the colored layer is preferably provided in order to improve the performance of the display medium 1. In consideration of the purpose of the colored layer 9, it is demanded to have a function of absorbing at least light at the absorption wavelength of the charge generating layer and light at the reflection wavelength of the display layer.

The colored layer 9 may be formed, for example, by a dry method, in which an inorganic pigment, an organic dye or an organic pigment is directly formed into a layer on the surface of the OPC layer 10 on the side of the charge generating layer 13, or a wet coating method, in which the pigment or dye is dispersed or dissolved in a suitable solvent along with a polymer binder to obtain a coating composition, which is then coated and dried to form the layer. Examples of the inorganic pigment include a cadmium series, a chromium series, a cobalt series, a manganese series and a carbon series. Examples of the organic dye and organic pigment include an azo series, an anthraquinone series, an indigo series, a triphenylmethane series, a nitro series, a phthalocyanine series, a perylene series, a pyrrolopyrol series, a quinacridone series, a polycyclic quinone series, a squalirium series, an azulenium series, a cyanine series, a pyrylium series and an anthrone series. Examples of the polymer binder include a polyvinyl alcohol resin and a polyacrylic resin.

The laminate layer 8 is provided for such a purpose that upon adhering the respective functional layers provided on the inner surfaces of the upper and lower substrates, unevenness on the layers is absorbed, and the layers are adhered. The laminate layer 8 is not an essential constitutional element of the invention. The laminate layer 8 may be formed of a polymer material having a low glass transition temperature, which is selected from such materials that are capable of adhering the display layer 7 and the colored layer 9 through heat or pressure. The laminate layer 8 is demanded to have transmissibility at least to incident light.

Examples of a material suitable for the laminate layer 8 include an adhesive polymer material (such as a urethane resin, an epoxy resin, an acrylic resin and a silicone resin).

Figure 5:
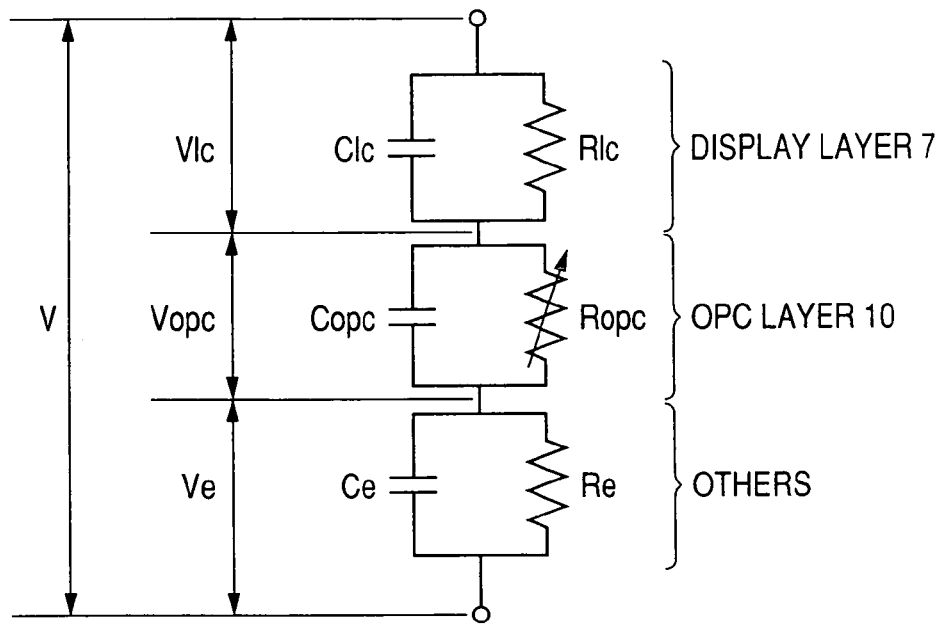
FIG. 5 is a diagram showing an equivalent circuit of a liquid crystal device having the structure shown in FIG. 1.

FIG. 5 is a diagram showing an equivalent circuit of a display medium (liquid crystal device) having the structure shown in FIG. 1. Clc and Rlc represent the electrostatic capacity and the resistance of the display layer 7, and Copc and Ropc represents the electrostatic capacity and the resistance of the OPC layer 10. Ce and Re represents the equivalent electrostatic capacity and the equivalent resistance of the other constitutional elements than the display layer 7 and the OPC layer 10.

Upon expressing the voltage applied from an external writing device 2 between the transparent electrodes 5 and 6 of the display medium 1 by V, partial voltages Vlc, Vopc and Ve are applied to each of the constitutional elements, which are determined by the impedance ratio among the constitutional elements. More specifically, immediately after applying the voltage, partial voltages determined by the capacity ratio of the constitutional element are formed, and with the lapse of time, the partial voltages are relaxed to such partial voltages that are determined by the resistance ratio of the constitutional element.

Since the resistance Ropc of the OPC layer 10 is changed corresponding to the intensity of the addressing light, the effective voltage applied to the display layer 7 can be controlled by the presence or absence of exposure. Upon exposure, the resistance Ropc of the OPC layer 10 is lowered to increase the effective voltage applied to the display layer 7, and upon non-exposure, on the other hand, the resistance Ropc of the OPC layer 10 is increased to lower the effective voltage applied to the display layer 7.

Figure 6:
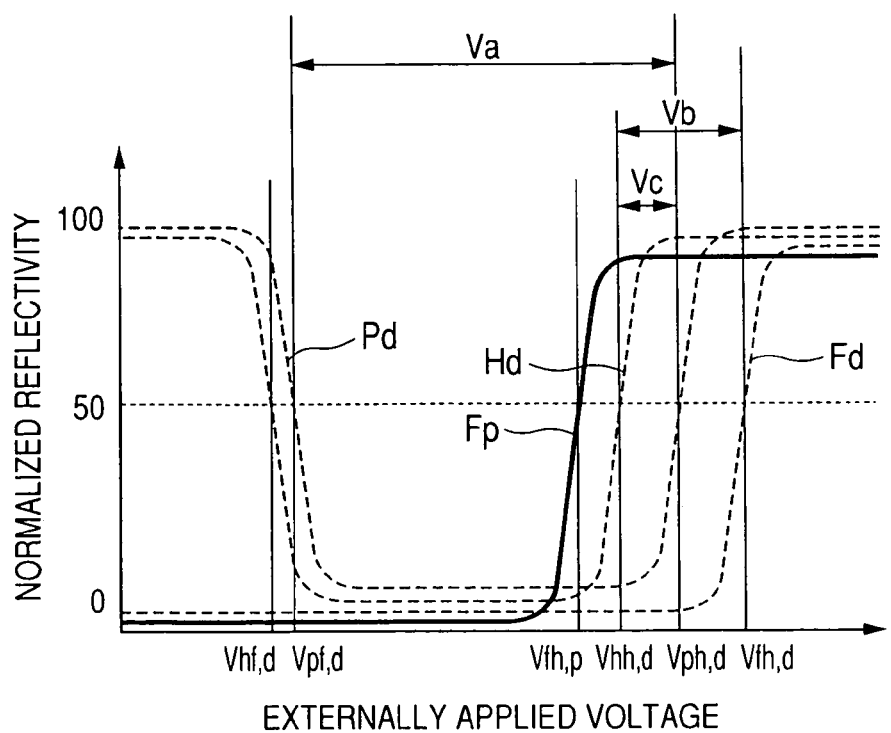
FIG. 6 is a graph showing change in switching behavior of a liquid crystal layer upon exposure and non-exposure.

FIG. 6 is a graph showing change in switching behavior of the display layer (liquid crystal layer) 7 upon exposure and non-exposure. In FIG. 6, the ordinate shows the normalized reflectivity, which is the reflectivity of the display layer obtained by once applying an external voltage and the releasing the voltage, and is obtained by normalizing the reflectivity with the maximum reflectivity as 100 and the minimum reflectivity as 0. In FIG. 6, the solid line Fp shows the switching behavior on exposure with a focal conic texture state (F state) as the initial state, the broken line Pd shows the switching behavior on non-exposure with a planar texture state (P state) as the initial state, the broken line Hd shows the switching behavior on non-exposure with a homeotropic texture state (H state) as the initial state, and the broken line Fd shows the switching behavior on non-exposure with a focal conic texture state (F state) as the initial state.

Figure 14A:
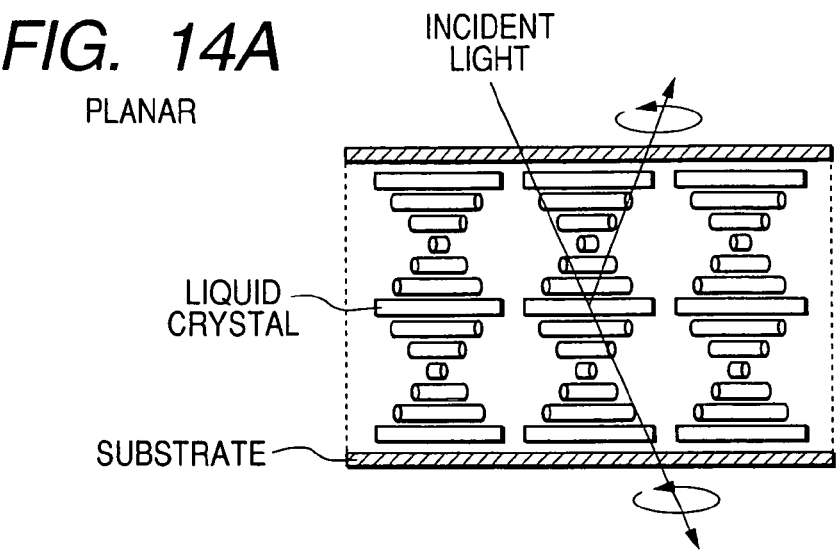
Figure 14B:
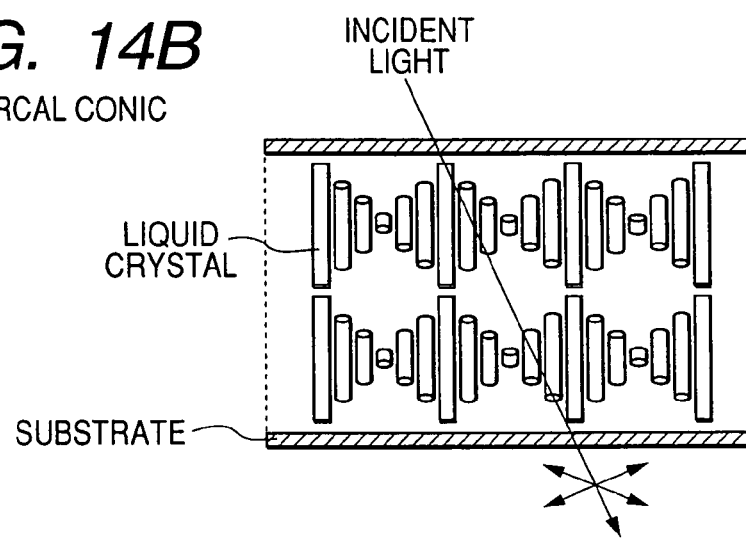
Figure 14C:
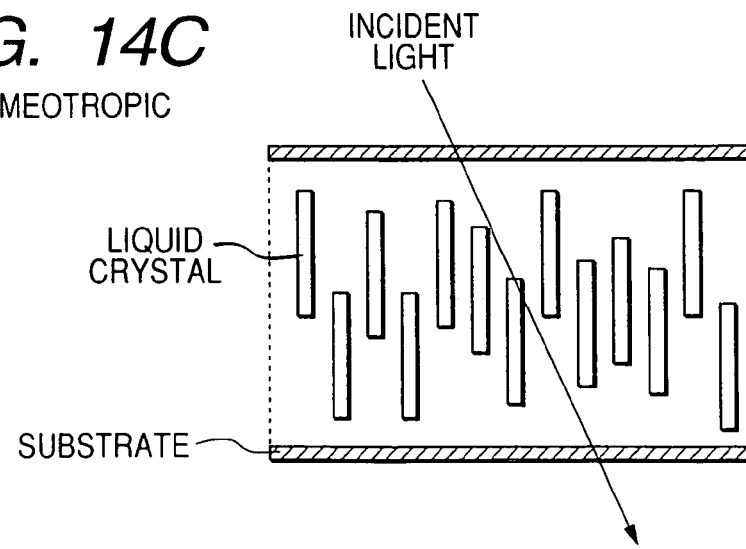
Figure 15:
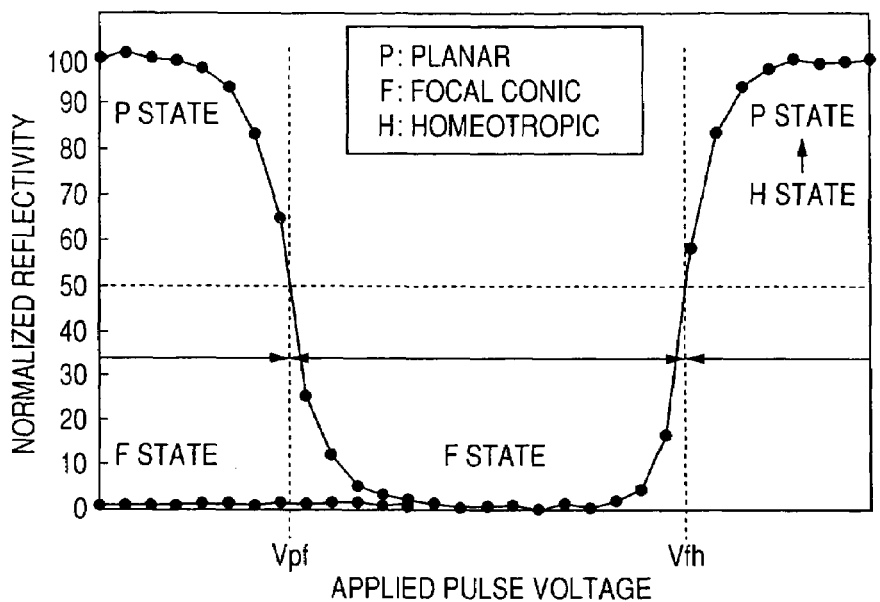
FIG. 15 is a graph showing a switching behavior of a cholesteric liquid crystal.
Figure 16:
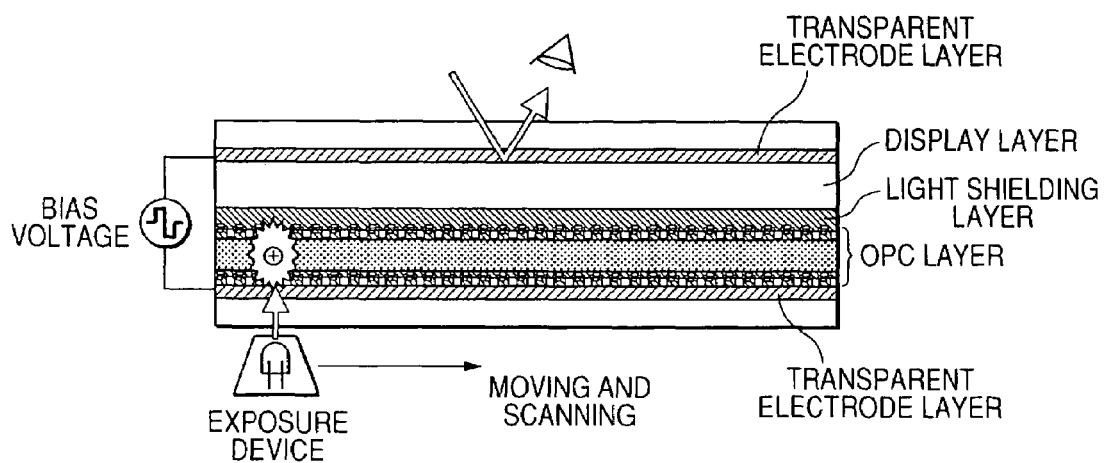
FIG. 16 is a schematic cross sectional view showing a liquid crystal device using the conventional driving method of a liquid crystal device where an image is written therein with a scanning exposure device.

The liquid crystal is changed from the P state or the H state as the initial state to the P state, the F state or the H state, and from the F state as the initial state to the F state or the H state, corresponding to the intensity of the external voltage applied, and in the case where the final state is the P state or the F state, the state is maintained after releasing the applied voltage, but the H state as the final state is phase-changed to the P state as shown in FIG. 2. Therefore, irrespective to exposure or non-exposure, the P state or the F state is selected as the final phase state by the intensity of the applied voltage. As shown in FIG. 14, light is reflected in the P state, and is transmitted in the F state.

The graph shown in FIG. 6 indicates that the state of the display layer (liquid crystal layer) is changed from the P state to the F state to the H state (finally to the P state), or from the F state to the H state (finally to the P state), with increase of the external voltage applied shown by the abscissa, and the reflectivity on the display surface (which is the reflectivity to the incident light from the side of the transparent substrate 3 in FIG. 1) is also changed corresponding thereto. The voltages at which the phase changes occur are referred to as threshold values, and in particular, the threshold value of transition from the P state to the F state is referred to as a first threshold value, and the threshold value of transition from the F state to the H state is referred to as a second threshold value.

In the graph shown in FIG. 6, the threshold value (first threshold value) voltage upon non-exposure with the H state as the initial state is represented by Vhf,d, the threshold value (first threshold value) voltage upon non-exposure with the P state as the initial state is represented by Vpf,d, the threshold value (second threshold value) voltage upon non-exposure with the H state as the initial state is represented by Vhh,d, the threshold value (second threshold value) voltage upon non-exposure with the P state as the initial state is represented by Vph,d, the threshold value (second threshold value) voltage upon non-exposure with the F state as the initial state is represented by Vfh,d, and the threshold value (second threshold value) voltage upon exposure with the F state as the initial state is represented by Vfh,p.

In the invention, the second threshold value is used as the threshold value of phase change upon writing an image. That is, in the non-exposure state, an external voltage Va corresponding to such an intensity that is Vpf,d or higher, Vph,d or lower and Vfh,d or lower is applied (it is possible that an external voltage Vc that is Vfh,p or higher, Vhh,d or higher and Vph,d or lower, which crosses an external voltage Vb applied in the next step that is Vfh,p or higher, Vhh,d or higher and Vfh,d or lower, is applied in the initial stage) to make the reflected part of the previous image on the display layer 7 undergo transition from the P state to the F state to set the entire surface to the F state (initializing step or operation), and then the display layer 7 is exposed imagewise while applying an external voltage Vb that is Vfh,p or higher, Vhh,d or higher and Vfh,d or lower with an exposure unit (device) (writing step or operation).

The magnitude relationship among the threshold values shown in FIG. 6 is a representative example, and there may be such a case where magnitude relationship is partially different, but the condition of the voltages applied in the steps is determined as above.

According to the writing step (writing operation), the non-exposed part is still in the F state since it does not exceed the second threshold value Vfh,d of the broken line Fd, but the exposed part exceeds the second threshold value Ffh,p of the solid line Fp to undergo transition from the F state to the H state, whereby an image is written therein through selection of the exposed part. Both the non-exposed and exposed parts are in a non-exposed state in the writing step after the selection (i.e., the term where the subsequent lines are selected), but since the parts are still applied with the voltage Vb that is the second threshold value Vhh, d of the broken line Hd or more and the second threshold value Vfh,d of the broken line Fd or lower, the H state of the exposed part and the F state of the non-exposed part are maintained by utilizing the hysteresis behavior of the states.

The switching (hysteresis) behavior of the display layer 7 can be controlled, for example, by the dielectric anisotropy, the elastic modulus, the helical pitch, the skeleton structure and side chain of the polymer, and the phase separation process of the cholesteric liquid crystal 12 constituting the display layer 7, the morphology of the interface between the polymer matrix 11 and the display layer 7, and the extent of the anchoring effect at the interface between the polymer matrix 11 and the display layer 7, which is determined by the aforementioned factors in total.

More specifically, examples of the factors include the species and compositional ratio of the nematic liquid crystal, the species of the chiral agent, the species of the resin, the species and compositional ratio of a monomer, an oligomer, an initiating agent and a crosslinking agent, which are starting materials of the polymer resin, the polymerization temperature, the exposure light source, the exposure intensity and the exposure time for photopolymerization, the electron beam intensity and the exposure time for electron beam polymerization, the ambient temperature, and the species and compositional ratio of the solvent, the solution concentration, the wet thickness, the drying temperature, the temperature for initiating temperature decrease and the temperature decreasing rate upon coating and drying the coating composition, but the invention is not limited to these factors.

(Writing Device)

The writing device (driving device of a liquid crystal device) 2 in the invention is an apparatus for writing an image to the display medium 1, and has a light irradiating part (exposure device) 18 irradiating the display medium 1 with addressing light and a voltage applying part (electric power device) 17 applying a bias voltage to the display medium 1 as major constitutional elements, and also a controlling circuit 16 controlling them.

(Light Irradiating Part)

The light irradiating part (exposure device) 18 has such a function that the display device 1 is irradiated with addressing light having a prescribed imagewise pattern, and is not particularly limited as far as it can irradiate the surface of the display medium 1 (specifically, the OPC layer) with a desired light image pattern (including spectrum, intensity and spatial frequency).

The addressing light irradiated with the light irradiating part 18 preferably satisfies the following conditions.

The spectrum thereof preferably contains energy of the absorption wavelength range of the OPC layer 10 as much as possible.

The irradiation intensity thereof is preferably such an intensity that is the second threshold value of transition from a focal conic texture (F) state to a homeotropic texture (H) state or higher in a bright state but is the second threshold value or lower in a dark state.

The irradiation time thereof is preferably 2 ms or more per line or pixel when the irradiation is carried out by scanning per line or pixel, and is preferably 2 ms or more in total when the irradiation is carried out by bulk exposure.

The addressing light irradiated with the light irradiation part 18 preferably has peak intensity within the absorption wavelength range of the OPC layer 10 and has a bandwidth as narrow as possible.

Examples of the light irradiating part 18 include the following.

(1-1) A unit capable of forming a two-dimensional light emitting pattern through scanning operation, such as a unit obtained by arranging light sources (such as a cold cathode tube, a xenon lamp, a halogen lamp, a light emitting diode (LED), an electroluminescent (EL) device and a laser) one-dimensionally in an array form, a unit obtained by combining a polygonal mirror with the array.

(1-2) A combination of a uniform light source, such as an array of light sources and a combination of a light guide plate and the array, and a light modulating device (such as an LCD and a photomask).

(2) A self-luminescent display obtained, for example, by arranging light sources in a planar form (such as CRT, PDP, EL, LED, FED and SED).

(3) A combination of (1-1), (1-2) or (2) with an optical device (such as a microlens array, a selfoc lens array, a prism array and a viewing angle adjusting sheet).

In the invention, the scanning device (1-1) (i.e., the exposure device capable of exposing the entire surface of the liquid crystal device by scanning one-dimensionally or two-dimensionally) is particularly preferably used since the advantages of the invention can be maximally enjoyed as having been described.

(Voltage Applying Part)

The voltage applying part (electric power source) 17 has such a function that the prescribed bias voltage is applied to the display medium 1, and a desired voltage waveform can be applied to the display medium (between the electrodes). It is preferred that the voltage applying part 17 can output AC with a high through rate. The voltage applying part 17 may be, for example, a bipolar high voltage amplifier.

The application of a voltage to the display medium 1 by the voltage applying part 17 is effected between the transparent electrodes 5 and 6 through contact terminals 19.

The contact terminals 19 are such members that provide conduction between the voltage applying part 17 and the display medium 1 (transparent electrodes 5 and 6) through contact therewith, and has high electroconductivity and a small contact resistance with the transparent electrodes 5 and 6 and the voltage applying part 17. It is preferred that the display medium 1 and the writing device 2 can be separated from each other at either the transparent electrodes 5 and 6 or the voltage applying part 17 or at both of them.

Examples of the contact terminals 19 include terminals formed of a metal (such as gold, silver, copper, aluminum and iron), carbon, a composite obtained by dispersing these materials in a polymer, and an electroconductive polymer (such as a thiophene series and a polyaniline series) having a clip shape or a connector shape capable of holding the electrodes.

(Controlling Circuit)

The controlling circuit 16 is such a member that have a function of appropriately controlling the operations of the voltage applying part 17 and the light irradiating part 18 corresponding to image data input from an external device (such as an image importing device, an image receiving device, an image processing device, an image reproducing device and a device having plural functions among these). The control operations of the controlling circuit 16 include the initializing step (operation), the writing step (operation) and the display fixing step (operation), which are characteristic in the invention, and the details thereof will be described later.

(Total Constitution)

Figure 7:
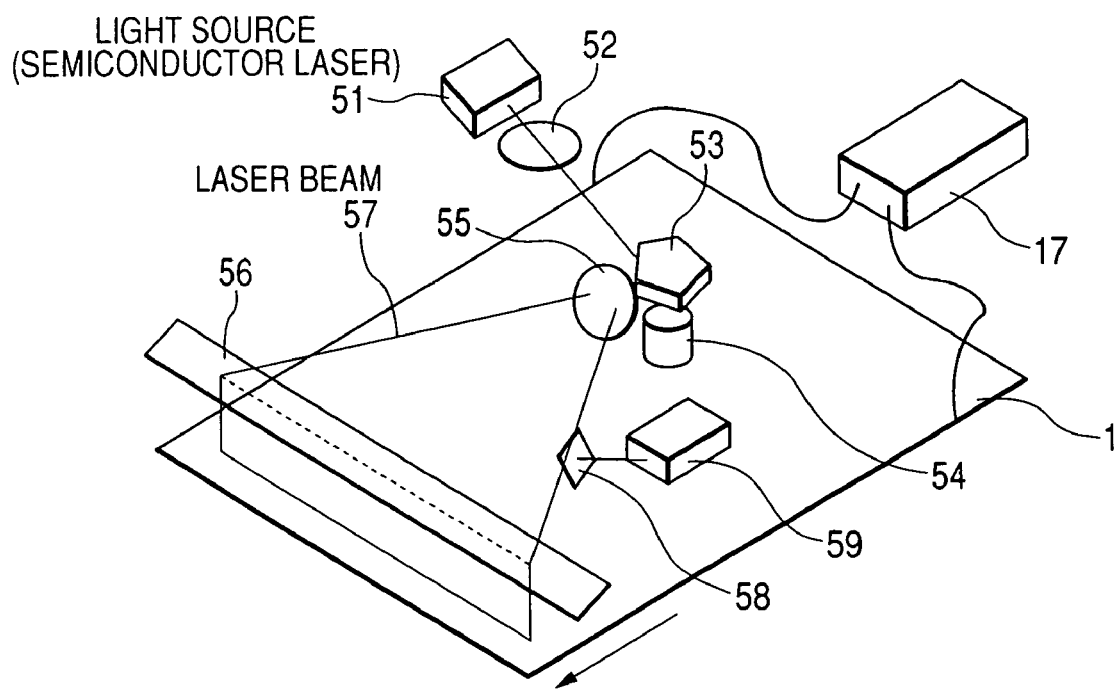
FIG. 7 is a perspective view showing an example of a driving device of a liquid crystal device capable of being applied to the driving method of a liquid crystal device of the invention.

FIG. 7 is a perspective view showing an example of a writing device (driving device of a liquid crystal device) capable of being applied to the driving method of a liquid crystal device of the invention, in which a laser is used as an exposing device. The controlling circuit 16 is not shown in FIG. 7.

The exposure optical system uses a semiconductor laser as a light source 51 and constituted by a polygonal motor 54, an f-θ lens 55, a return mirror 56 and the like, and a laser beam 57 is sent to a synchronizing signal generator 59 through a beam adjusting mirror 58 and used for synchronizing the scanning timing. While not shown in the figure, the controlling device of the exposure device is the same as in an ordinary laser exposure device for electrophotography.

The feed of the display medium (liquid crystal device) 1 in the subscanning direction is carried out, for example, in such a manner that the display medium 1 fixed in a planar form is fed with a pulse motor, or the display medium 1 having flexibility, the substrate of which is formed of a film, is fixed to a drum, which is rotated with a motor.

In the case where the voltage applying part 17 supplies different voltages between the initializing operation and the writing operation, such an electric power source is necessarily used that can supply two levels in voltage, but such a configuration may not be employed in the case where the same voltage may be fed in both the operations as described later.

Figure 8:
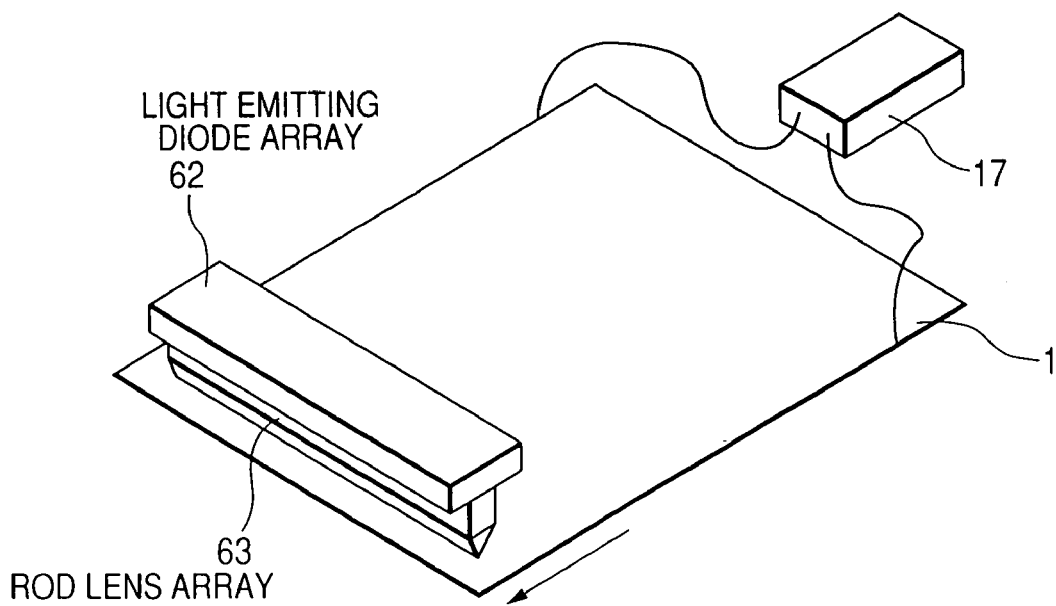
FIG. 8 is a perspective view showing another example of a driving device of a liquid crystal device capable of being applied to the driving method of a liquid crystal device of the invention.

FIG. 8 is a perspective view showing another example of a writing device (driving device of a liquid crystal device) capable of being applied to the driving method of a liquid crystal device of the invention, in which a light emitting diode array is used as an exposing device. This embodiment has the same constitution as in the aforementioned embodiment shown in FIG. 7 except that the light source for exposure is constituted by a light emitting diode array 62 and a self-focusing rod lens array 63.

(Operation)

The driving method of a liquid crystal device of the invention and the operation of the driving device of a liquid crystal device of the invention will be described in detail below with reference to the driving device of a liquid crystal according to the embodiment shown in FIG. 1.

Figure 9:
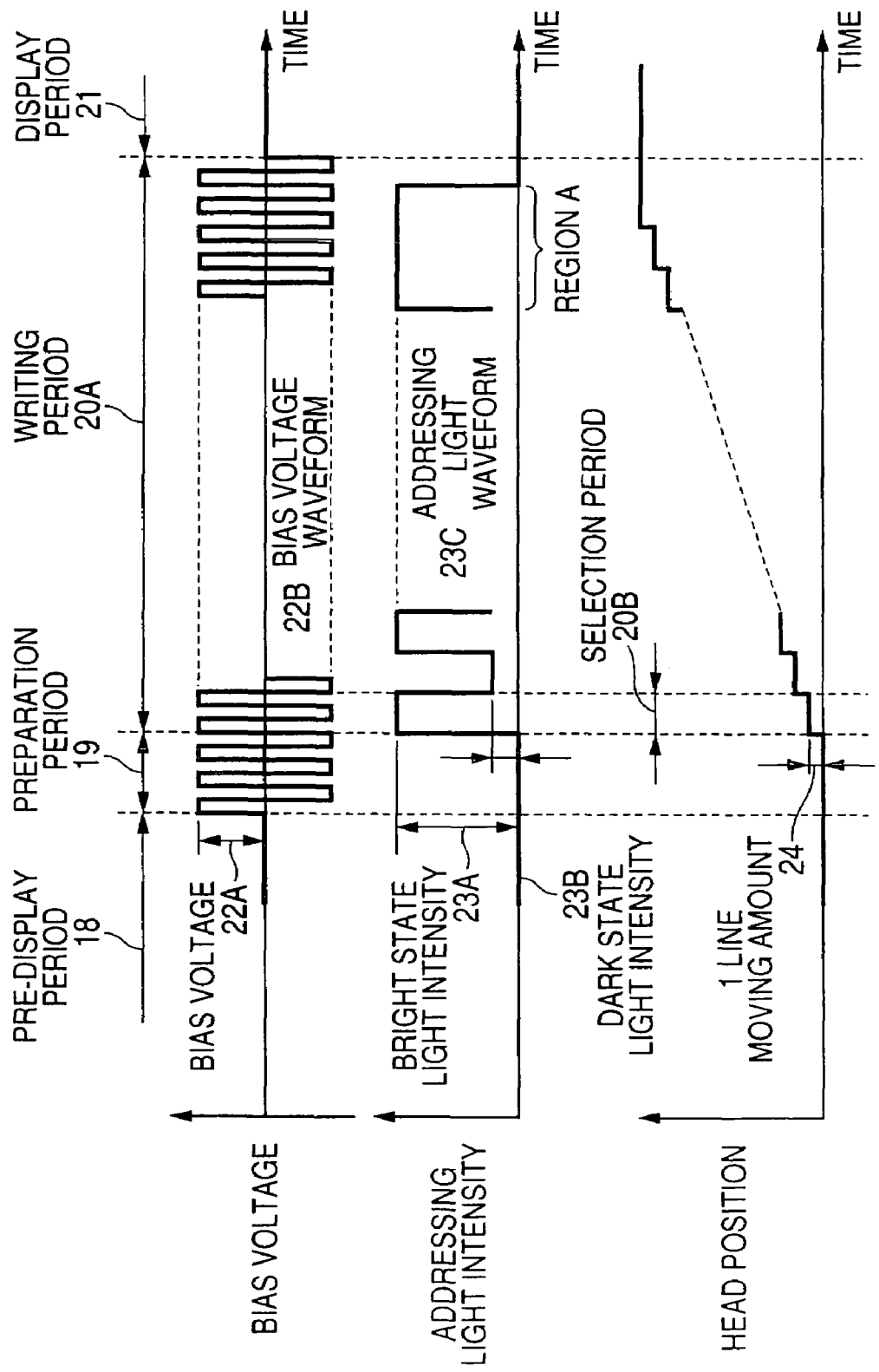
FIG. 9 is a chart showing the mutual relationship among the bias voltage, the addressing light intensity and the position of the exposing device (head) in chronological order of the driving device of a liquid crystal device according to the embodiment shown in FIG. 1.
Figure 10:
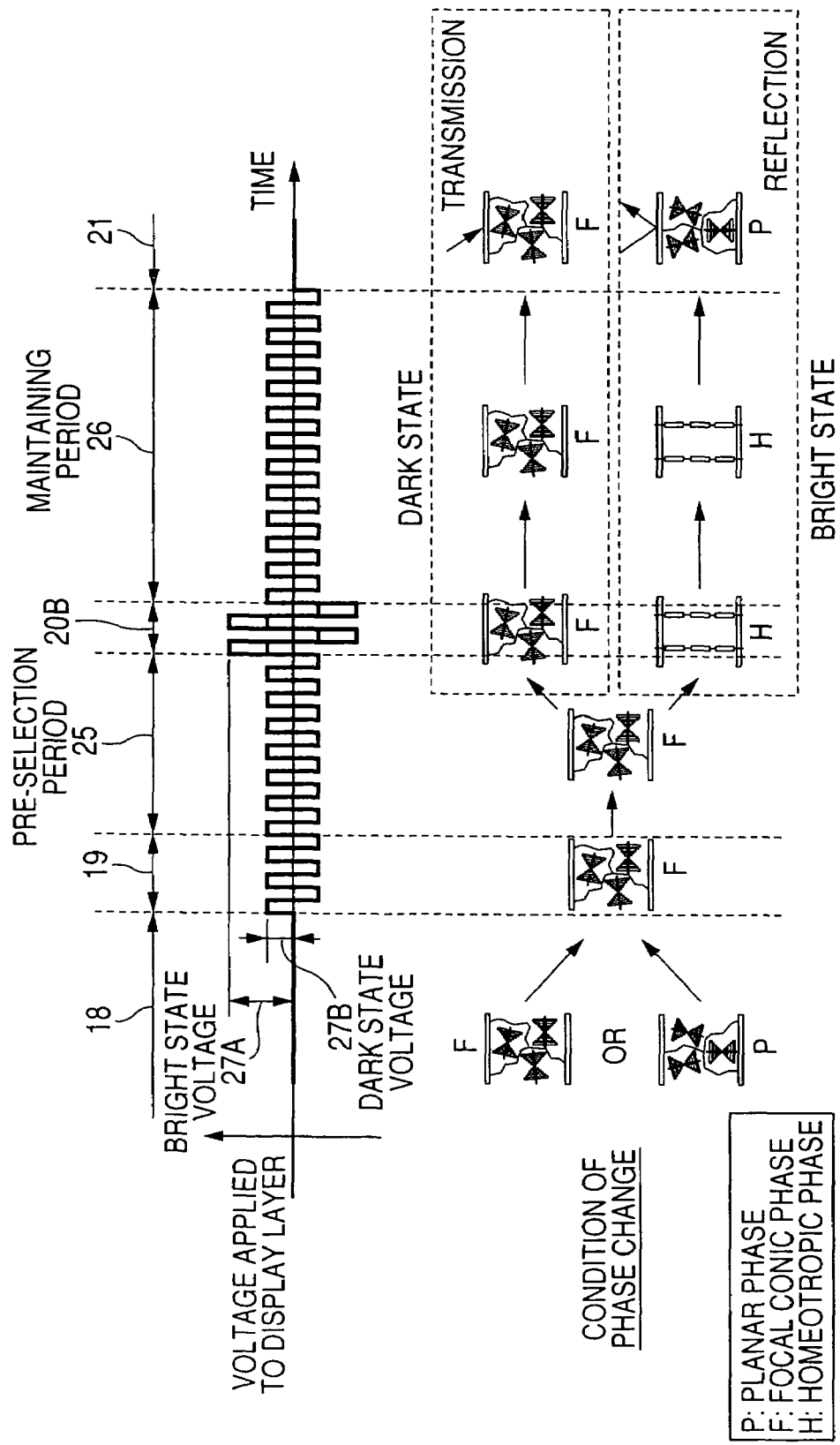
FIG. 10 is a chart schematically showing the relationship between the substantial voltage applied to the liquid crystal layer (display layer) and the orientation state of the liquid crystal corresponding to the chart shown in FIG. 9.

FIG. 9 is a chart showing the mutual relationship among the bias voltage, the addressing light intensity and the position of a head (the exposing device in the light irradiating part 18) in chronological order of the driving device (writing device) of a liquid crystal device according to the embodiment shown in FIG. 1. FIG. 10 is a chart schematically showing the relationship between the substantial voltages applied to the display layer 7 and the orientation state of the liquid crystal in each period corresponding to the chart shown in FIG. 9.

In the writing device 2, the head is at a waiting position in a pre-display period 18 before driving. The display medium 1 maintains a pre-wiring state, and import of control signals and image data and data conversion are carried out by the controlling circuit 16. In the case where the writing device 2 is separated from the display medium 1, they are set at the prescribed positions to connect the contact terminals 19. The time required for the pre-display period 18 is such a period of time that is sufficient for completing the preparation process required for writing, such as import of control signals and image data and data conversion by the controlling circuit 16 and setting of the display medium 1.

As shown in FIG. 9, after the pre-display period 18 where no bias voltage is applied and no addressing light is irradiated, a bias voltage 22A constituted by alternating current pulses of a bias voltage waveform 22B is applied as a preparation period 19 (initializing step or operation).

In the preparation period 19, the entire cholesteric liquid crystal 12 in the display layer 7 becomes a focal conic texture through application of the bias voltage Va as shown in FIG. 6. The display medium 1 having the cholesteric liquid crystal 12 having become a focal conic texture by the operation of this step is in such a state that incident light is transmitted as shown in FIG. 14.

In the example shown by the charts in FIGS. 9 and 10, the bias voltage applied in the preparation period 19 is not the voltage Va but is a voltage Vc overlapping a voltage Vb to be applied in a writing period 20A as the next step. Accordingly, the bias voltage with constant intensity is applied over the period from the preparation period 19 to the end of the writing period 20A (maintaining period 26).

An actual writing operation is carried out in the writing period 20A (writing step or operation). That is, the head starts scanning, and selects a head position corresponding to an image to be written in to irradiate with light having a bright state light intensity 23A within a selection period 20B. In the writing period 20A, the cholesteric liquid crystal is selected to be an F state or an H state depending on the image to be written in. In this stage, no reflection image is formed in the display medium 1.

As having been described, the selection period 20B is significantly shortened as compared to the conventional transition from a P state to an F state since the transition from an F state to an H state with a high phase change rate is employed in the invention.

The bias voltage V is applied to both ends of the combination of the display layer 7 and the OPC layer 10 electrically connected in series as apparent from FIGS. 1 and 5. Accordingly, the display layer 7 and the OPC layer 10 are applied with partial voltages of the bias voltage v, respectively, and the partial voltage Vlc applied to the display layer 7 (i.e., the display layer applied voltage) receives influence of change of the resistance Ropc of the OPC layer.

The resistance Ropc of the OPC layer 10 is lowered through light irradiation in the selection period 20B, which brings about increase of the partial voltage applied to the display layer 7 electrically connected in series thereto. As a result, as shown in FIG. 10, the display layer applied voltage is increased from a dark state voltage 27B to a bright state voltage 27A to exceed the second threshold value of the cholesteric liquid crystal 12 in the display layer 7, whereby the liquid crystal is changed from an F state to an H state. The voltage that is actually applied to the display layer is a non-rectangular wave containing relaxation, but FIG. 10 shows for simplicity that the voltage is changed with rectangular wave maintained to express the change of the effective voltage.

The head sequentially continues the scanning operation, and on and off states of light irradiation are selected on respective positions to form a latent image where an F state and an H state are present as an imagewise mixture. The light irradiated part undergoes transition from an F state to an H state, and the light non-irradiated part maintains an F state as it is. The mixed state of the F and H states is maintained since an F state and an H state has a hysteresis relationship.

The positions that have not yet been selected by the head are in a pre-selection period 25 before the selection period 20B, and the F state is stably maintained within the pre-selection period 25.

In the case where exposure is to be carried out over plural continuous areas, for example, an area A in FIG. 9, the addressing light may be continuously irradiated over the plural selection periods corresponding to the plural areas. In this case, the light irradiation is carried out by stopping the head at the respective lines as shown in FIGS. 9 and 10, but the lines may be continuously scanned by adjusting that each line is subjected to light irradiation with a prescribed period of time (2 ms or more).

In the case where exposure is not to be carried out over plural areas, on the other hand, exposure with the addressing light may be stopped over the plural continuous selection periods, but since the head is not necessarily stopped at the corresponding position within the periods, the head may be moved directly to the next area to be exposed by skipping the areas not to be exposed. According to the constitution, the writing time can be further shortened.

After completing the scanning operation of all the display positions with the head, irradiation with the addressing light is terminated, and the bias voltage having been applied is released, so as to transfer to a display period 21. In the display period 21, the applied bias voltage is released, and the orientation of the cholesteric liquid crystal 12 is changed to a state having a memory effect under no electric field to display an image on the display medium 1. In the bright part (irradiated with the addressing light) of the image, transition from an H state to a P state through a transition state, such as a transient planar (TP) state, and in the dark part (not irradiated with the addressing light), the F state having a memory effect is maintained as it is. Consequently, a stable recorded image is displayed on the display medium 1.

The display period 21 may be such a period of time that is required for completing the orientation changes. The display medium 1 may be separated from the writing device 2 within the display period 21 since the bias signal and the addressing light are not necessary in this period.

The invention has been described in detail with reference to preferred embodiments, but the invention is not limited to the embodiments. A skilled person in the art can make appropriate modifications in the invention based on the conventional knowledge. Any embodiment having the modifications made therein is encompassed in the scope of the invention as long as the embodiment has the constitution of the invention.

EXAMPLE

The invention will be described in more detail with reference to the following examples, but the invention is not limited to the examples.

As a liquid crystal device that can be applied to the invention, a display medium 1 shown in FIG. 1 is produced experimentally, and an image is written therein by utilizing a driving method of a liquid crystal device or a driving device of a liquid crystal device according to the invention and those of a comparative example. The procedures will be described with reference to FIG. 1.

A polyethylene terephthalate film having a thickness of 125 μm having an ITO film (surface resistance: 300Ω per square) formed on one surface thereof (Hi-beam, produced by Toray Industries, Ltd.) is cut into a 50.8 mm (2 inch) square to obtain transparent substrate 4 and a transparent electrode 6. A charge generating material (titanium phthalocyanine pigment) is dispersed with a paint shaker in a solution obtained by dissolving a polyvinylbutyral resin in butanol to obtain a coating composition, which is then coated and dried by the spin coating method on the transparent electrode on the surfaces having the ITO film formed thereon to a dry thickness of 0.2 µm, so as to form a charge generating layer 15.

A polycarbonate resin and a charge transporting material (benzidine-N,N'-bis(3-methylphenyl)-1,1'-biphenyl-4,4'-diamine) are dissolved in monochlorobenzene to obtain a coating composition, which is then coated and dried by the dip coating method on the charge generating layer 15 to a dry thickness of 6 µm, so as to form a charge transporting layer 14. A charge generating material (titanium phthalocyanine pigment) is dispersed with a paint shaker in a solution obtained by dissolving a polyvinylbutyral resin in butanol to obtain a coating composition, which is then further coated and dried by the spin coating method on the charge transporting layer 14 to a dry thickness of 0.2 µm, so as to form a charge generating layer 13. Consequently, an OPC layer 10 having three layers, i.e., the charge generating layer 15, the charge transporting layer 14 and the charge generating layer 13, is completed.

A polyvinyl alcohol aqueous solution having a carbon black pigment dispersed therein is coated and dried by the spin coating method on the OPC layer 10 to a dry thickness of 1.2 µm, so a to form a colored layer 9. A two-component urethane laminating agent (A315/A50, produced by Mitsui Takeda Chemicals, Inc.) diluted with butylacetate is coated and dried by the spin coating method on the colored layer 9 to a dry thickness of 1.0 µm, so as to form a laminate layer 8.

As a cholesteric liquid crystal, 77.5% by mass of a nematic liquid crystal (E7, produced by Merck & Co., Inc.), 18.8% by mass of a dextrochiral agent (CB15, produced by Merck & Co., Inc.) and 3.7% by mass of a dextrochiral agent (R1011, produced by Merck & Co., Inc.) are mixed to prepare a material reflecting green light.

The cholesteric liquid crystal is emulsified in a 0.25% by mass sodium dodecylbenzenesulfonate aqueous solution by using a membrane emulsifying apparatus having a ceramic porous membrane having a pore diameter of 4.2 µm (Microkit, produced by SPG Technology Co., Ltd.) under a nitrogen pressure of 11.8 kPa (0.12 kgf/cm$^2$). The resulting emulsion has an average particle diameter of the cholesteric liquid crystal droplets of 14.9 µm with a standard deviation of particle diameter of 1.32 µm, which is close to the monodispersed state.

The emulsion is then allowed to stand to precipitate the cholesteric liquid crystal droplets, and the supernatant is removed to obtain a concentrated emulsion. 4 parts by mass of a 7.7% by mass aqueous solution of acid process bone gelatin (jelly strength: 314, produced by Nippi, Inc.) is added to 1 part by mass of the concentrated emulsion to obtain a coating composition for a display layer having a volume fraction of nonvolatile components in the coating composition of about 0.15 and a volume fraction of the cholesteric liquid crystal in the nonvolatile components of about 0.70.

A transparent substrate 3 and a transparent electrode 5 are produced with a PET film having an ITO transparent electrode (Hi-beam, produced by Toray Industries, Ltd.), which is the same as that used as the transparent substrate 4 and the transparent electrode 6. The coating composition for a display layer having been heated to 50° C. to make the gelatin in a sol state is coated on the transparent electrode on the surfaces having the ITO film formed thereon by using an applicator having a micrometer with a gap having been adjusted to provide a wet thickness of 90 µm.

The coated assembly is maintained in a high temperature and high humidity chamber at 50° C. and 90% RH for 15 minutes, and then dried at room temperature for 12 hours, so as to form a PDLC layer having a thickness of about 12 µm, in which monodispersed cholesteric liquid crystal droplets having a diameter of 15 µm in a slightly flatted shape dispersed densely to form a single layer in the polymer binder.

The two substrates thus produced are superimposed on each other in such a manner that the display layer 7 and the laminate layer 8 face each other, and the end surfaces of the two substrates are slightly deviated, and the assembly is passed through a laminator at 100° C. for adhesion to obtain a display medium 1.

The functional layers on the deviated end surface are removed to expose the ITO electrodes, whereby the transparent electrodes 5 and 6 can effect conduction from an exterior of the display medium 1.

The display medium 1 thus obtained has such an appearance is that the display layer 7 exhibits green selective reflection.

The display medium 1 has a second threshold value voltage (from an F state to an H state) in a dark state of 190 V and a first threshold value voltage (from a P state to an F state) of 70 V.

Commercially available rubber covered clips (contact terminals 19) attached with lead wires are connected to the transparent electrodes 5 and 6 of the resulting display medium, respectively, and the other ends of the lead wires are connected to a high speed and high pressure amplifier (Model HEOPT-1B60, produced by Matsusada Precision Inc.) as the voltage applying part 17. The high speed and high pressure amplifier can apply a bias voltage having a frequency of 100 Hz at from 0 to ±1,000 V.

A light emitting diode light source (Model HLV-27-NR-R, produced by CCS Inc.) is used as the light source, which is attached to a linear stage (EZlimo Model EZHS, produced by Oriental Motor Co., Ltd.) to make the light source capable of scanning on the surface of the display medium 1 on the side of the OPC layer 10, and thus a light irradiating part 18 is produced. The light irradiating part 18 can radiate red light having a peak wavelength of 625 nm, a band half value width of 20 nm and a radiation intensity of 1.0 mW/cm$^2$.

An arbitrary waveform generator (Model EZ1960, produced by NF Corp. (NF Kairo Sekkei Block K.K.)) is used as the controlling circuit 16, which is wired to configure in such a manner that the operations of the voltage applying part 17 and the light irradiating part 18 can be appropriately controlled based on image data supplied from a personal computer.

According to the aforementioned procedures, a writing device (driving device of a liquid crystal device) 2 having a display device (liquid crystal device) 1 set therein, which is to be subjected to Example and Comparative Example, is obtained.

Example 1

An initializing operation (step) is carried out by applying a bias voltage of 150 V for 200 ms with the voltage applying part 17, whereby the entire surface of the display medium becomes an F state. Thereafter, a writing operation (step) is carried out by exposing the display medium 1 with the light irradiating part 18 while applying a constant bias voltage. The bias voltage in the writing operation (step) is changed to 21 levels, i.e., from 100 to 300 V with a step of 10 V, the scanning speed in the light irradiating part 18 is changed to 5 levels, i.e., 800, 400, 200, 80 and 40 mm/s.

After completing the writing operation, the applied bias voltage is released (display fixing operation (step)), and after lapsing several seconds, the part having been irradiated with the addressing light (bright part) on the display surface of the display medium 1 (i.e., the surface on the side of the display layer 7) and the part having not been irradiated with the addressing light (dark part) are measured for reflectivity with an integrating sphere spectrometer (Model CM2002, produced by Konica Minolta Holding, Inc.) to obtain a bright/dark contrast ratio. The reflectivity referred herein is a value obtained by normalizing a reflection intensity measured according to the diffused illumination vertical receiving method of JIS Z8772 under the SCE (specular component exclude) condition, with the complete diffusing surface being 100%.

The bright/dark contrast ratio is obtained by dividing the bright reflectivity at the interference reflection peak wavelength of the cholesteric liquid crystal by the dark reflectivity at the wavelength. A higher value of the bright/dark contrast ratio means that a clear image with high contrast can be produced.

Figure 11:
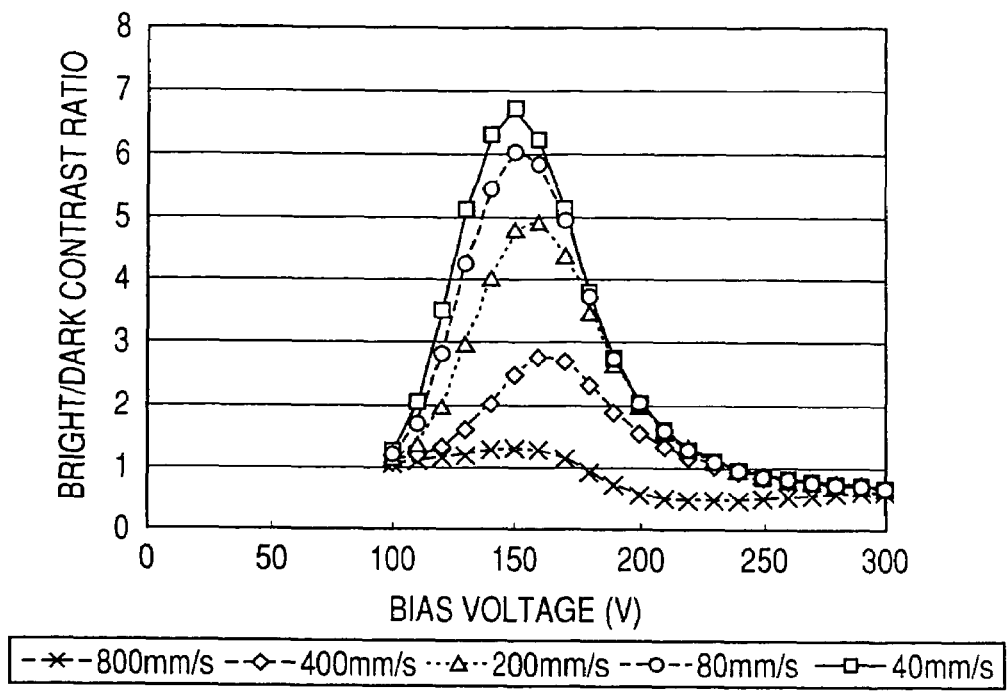
FIG. 11 is a graph showing the results of Example 1, in which the relationship between the scanning speed and the bias voltage is plotted for the bright/dark contrast ratio.

The results obtained are shown as a graph in FIG. 11. It is understood from the graph in FIG. 11 that when the scanning speed is decreased (i.e., when the writing time is prolonged), the bright/dark contrast ratio is increased. In consideration of practical conditions, it is understood that a scanning speed of 200 mm/s or less provides a sufficient bright/dark contrast ration.

Comparative Example 1

An initializing operation (step) is carried out by applying a bias voltage of 250 V for 200 ms with the voltage applying part 17, whereby the entire surface of the display medium becomes a P state. Thereafter, a writing operation (step) is carried out by exposing the display medium 1 with the light irradiating part 18 while applying a constant bias voltage. The writing was carried out in the same manner as in Example 1 except that the voltage applied in the writing operation (step) is changed from 0 to 150 V with a step of 10 V, and the bright/dark contrast ratio was measured in the same manner as in Example 1.

Figure 12:
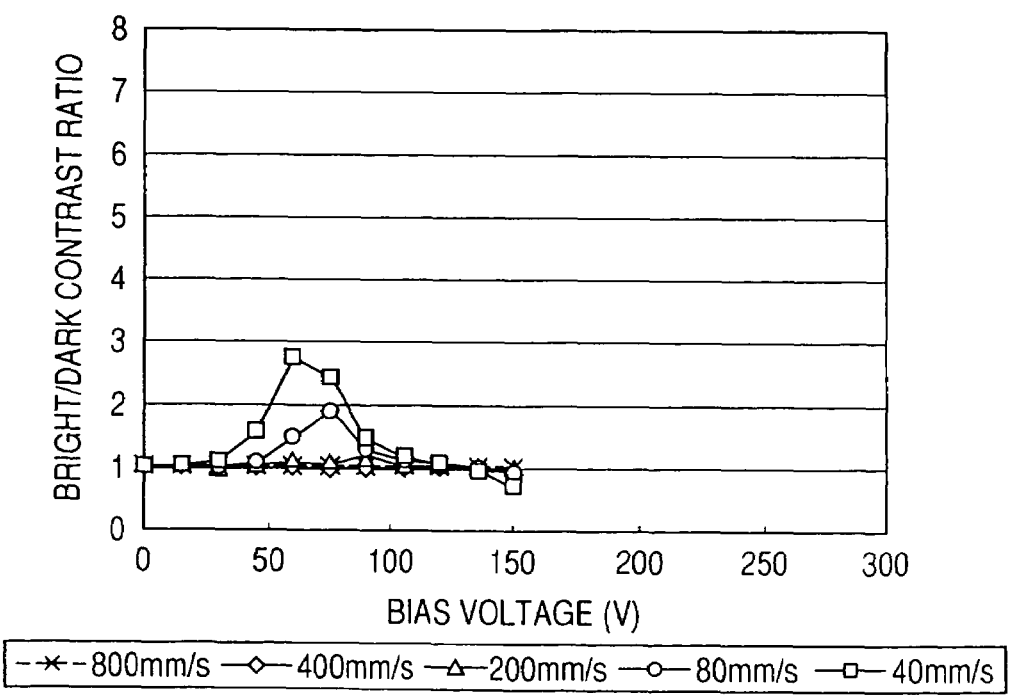
FIG. 12 is a graph showing the results of Comparative Example 1, in which the relationship between the scanning speed and the bias voltage is plotted for the bright/dark contrast ratio.

The results obtained are shown as a graph in FIG. 12. It is understood from the graph in FIG. 12 that when the scanning speed is decreased (i.e., when the writing time is prolonged), the bright/dark contrast ratio is increased. However, the bright/dark contrast ratio is totally low as compared to Example 1. In other words, it is understood that a sufficient bright/dark contrast ratio cannot be obtained with the scanning speed range under the experimental conditions, and an image that is practically sufficient cannot be displayed.

Figure 13:
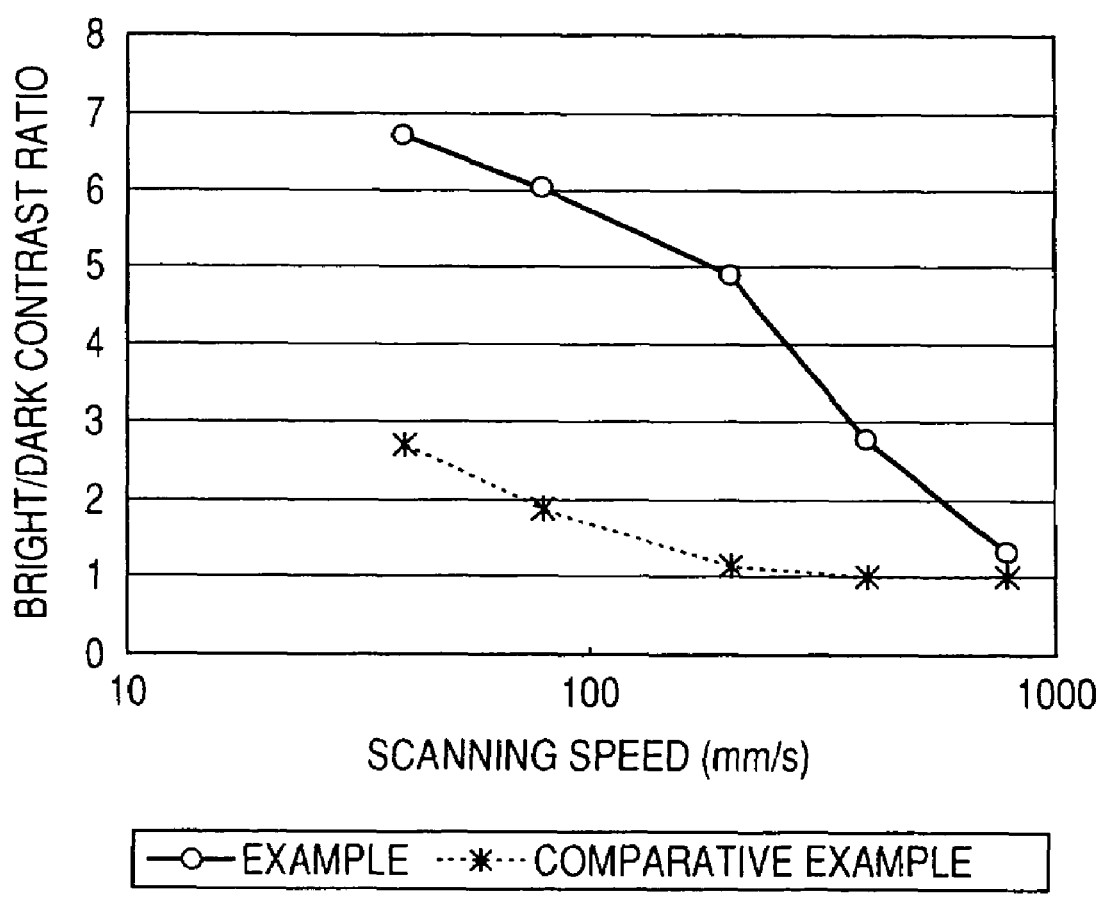
FIG. 13 is a graph obtained by plotting the maximum values of the bright/dark contrast ratios at the respective scanning speeds among the results obtained in Example 1 and Comparative Example 1.

FIG. 13 is a graph obtained by plotting the maximum values of the bright/dark contrast ratios at the respective scanning speeds among the results obtained in Example 1 and Comparative Example 1. It is understood from the graph in FIG. 13 that Example 1 is higher in bright/dark contrast ratio with respect to the scanning speed than Comparative Example 1, so as to enable high speed image writing.

The entire disclosure of Japanese Patent Application No. 2005-195703 filed on Jul. 5, 2005 including specification, claims, drawings and abstract is incorporated herein by reference in its entirety.

What is claimed is:

1. A driving method of a liquid crystal device for recording an image, the liquid crystal device comprising a liquid crystal layer comprising a cholesteric liquid crystal, a photoconductor layer accumulated on the liquid crystal layer, and electrodes disposed outside the liquid crystal layer and the photoconductor layer, the driving method comprising:

an initializing step of making an entire liquid crystal layer to be a focal conic texture by applying between the electrodes a voltage that exceeds a threshold value of transition from a planar texture to a focal conic texture in the liquid crystal layer;

a writing step of exposing the liquid crystal device imagewise while applying between the electrodes a voltage that does not exceeds a threshold value of transition from the focal conic texture to a homeotropic texture in the liquid crystal layer upon non-exposure but exceeds the threshold value upon exposure and that provides bistability of the focal conic texture and the homeotropic texture with hysteresis upon non-exposure; and a display fixing step of fixing a displayed image by releasing an application of voltage to change a part of the liquid crystal layer changed to the homeotropic texture to the planar texture.

2. The driving method of a liquid crystal device as claimed in claim 1, wherein an exposing unit in the writing step exposes by scanning an entire surface of the liquid crystal device one-dimensionally.

3. The driving method of a liquid crystal device as claimed in claim 1, wherein an exposing unit in the writing step exposes by scanning an entire surface of the liquid crystal device two-dimensionally.

4. The driving method of a liquid crystal device as claimed in claim 2, wherein the exposing unit uses laser light.

5. The driving method of a liquid crystal device as claimed in claim 3, wherein the exposing unit uses laser light.

6. The driving method of a liquid crystal device as claimed in claim 2, wherein the exposing unit uses a light-emitting diode array.

7. The driving method of a liquid crystal device as claimed in claim 3, wherein the exposing unit uses a light-emitting diode array.

8. A driving device of a liquid crystal device for recording an image, the liquid crystal device comprising a liquid crystal layer comprising a cholesteric liquid crystal, a photoconductor layer accumulated on the liquid crystal layer, and a pair of electrodes disposed outside the liquid crystal layer and the photoconductor layer, the driving device comprising:

an electric power unit capable of applying a voltage between the electrodes; and an exposing unit capable of exposing the liquid crystal device, wherein the driving device executes sequentially:

an initializing operation of making an entire liquid crystal layer become a focal conic texture by applying with the electric power unit a voltage that exceeds a threshold value of transition from a planar texture to a focal conic texture in the liquid crystal layer;

a writing operation of exposing the liquid crystal device imagewise with the exposing unit while applying with the electric power unit a voltage that does not exceeds a threshold value of transition from the focal conic texture to a homeotropic texture in the liquid crystal layer upon non-exposure but exceeds the threshold value upon exposure and that provides bistability of the focal conic texture and the homeotropic texture with hysteresis upon non-exposure; and a display fixing operation of changing a part of the liquid crystal layer changed to the homeotropic texture to the planar texture by releasing an application of voltage with the electric power unit.

9. The driving device of a liquid crystal device as claimed in claim 8, wherein the exposing unit exposes the liquid crystal device by scanning an entire surface of the liquid crystal device one-dimensionally.

10. The driving device of a liquid crystal device as claimed in claim 8, wherein the exposing unit exposes the liquid crystal device by scanning an entire surface of the liquid crystal device two-dimensionally.

11. The driving device of a liquid crystal device as claimed in claim 9, wherein the exposing unit is a laser light exposing unit.

12. The driving device of a liquid crystal device as claimed in claim 10, wherein the exposing unit is a laser light exposing unit.

13. The driving device of a liquid crystal device as claimed in claim 9, wherein the exposing unit is a light-emitting diode array.

14. The driving device of a liquid crystal device as claimed in claim 10, wherein the exposing unit is a light-emitting diode array.

* * * * *